United States Patent
Hasebe et al.

(10) Patent No.: US 11,225,534 B2
(45) Date of Patent: Jan. 18, 2022

(54) MODIFIED CONJUGATED DIENE-BASED POLYMER, POLYMER COMPOSITION, AND RUBBER COMPOSITION

(71) Applicant: Asahi Kasei Kabushiki Kaisha, Tokyo (JP)

(72) Inventors: Koichi Hasebe, Tokyo (JP); Ryo Suzuki, Tokyo (JP); Hiromi Nakafutami, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 218 days.

(21) Appl. No.: 16/608,449

(22) PCT Filed: Apr. 26, 2018

(86) PCT No.: PCT/JP2018/017087
§ 371 (c)(1),
(2) Date: Oct. 25, 2019

(87) PCT Pub. No.: WO2018/199267
PCT Pub. Date: Nov. 1, 2018

(65) Prior Publication Data
US 2020/0199258 A1  Jun. 25, 2020

(30) Foreign Application Priority Data

Apr. 28, 2017  (JP) .............................. JP2017-090342

(51) Int. Cl.
| | | |
|---|---|---|
| *C08C 19/25* | (2006.01) | |
| *C08K 3/013* | (2018.01) | |
| *C08F 236/10* | (2006.01) | |

(52) U.S. Cl.
CPC ............ *C08C 19/25* (2013.01); *C08F 236/10* (2013.01); *C08K 3/013* (2018.01)

(58) Field of Classification Search
CPC ........ C08C 19/25; C08K 3/013; C08F 236/10
USPC ....................................................... 524/572
See application file for complete search history.

(56) References Cited

U.S. PATENT DOCUMENTS

| | | | |
|---|---|---|---|
| 2006/0173138 A1 | 8/2006 | Hogan et al. | |
| 2013/0023624 A1* | 1/2013 | Sekikawa | C08K 3/36 524/572 |
| 2018/0037674 A1 | 2/2018 | Yamada et al. | |
| 2018/0066076 A1 | 3/2018 | Kyo et al. | |

FOREIGN PATENT DOCUMENTS

| | | | |
|---|---|---|---|
| EP | 1865023 A1 | | 12/2007 |
| EP | 2003146 A2 | | 12/2008 |
| EP | 2338919 A1 | | 6/2011 |
| EP | 2749575 A1 | | 7/2014 |
| JP | 2002-284814 A | | 10/2002 |
| JP | 2006-274010 A | | 10/2006 |
| JP | 2008-527150 A | | 7/2008 |
| JP | 2013-129693 A | | 7/2013 |
| JP | 2013129693 A | * | 7/2013 |
| JP | 2014-159579 A | | 9/2014 |
| JP | 2016-079217 A | | 5/2016 |
| JP | 2016079217 A | * | 5/2016 |
| JP | 2018-028047 A | | 2/2018 |
| TW | 201204746 A | | 2/2012 |
| TW | 201708272 A | | 3/2017 |
| WO | 2007/114203 A1 | | 10/2007 |
| WO | 2011/129425 A1 | | 10/2011 |
| WO | 2016/133154 A1 | | 8/2016 |

OTHER PUBLICATIONS

International Search Report issued in corresponding International Patent Application No. PCT/JP2018/008330 dated May 29, 2018.
Supplementary European Search Report issued in counterpart European patent Application No. 18790933.8 dated Apr. 3, 2020.
International Preliminary Report on Patentability and Written Opinion issued in corresponding International Patent Application No. PCT/JP2018/008330 dated Sep. 19, 2019.

* cited by examiner

*Primary Examiner* — Kelechi C Egwim
(74) *Attorney, Agent, or Firm* — Morgan, Lewis & Bockius LLP

(57) ABSTRACT

A modified conjugated diene-based polymer according to the present invention has a weight average molecular weight of $20\times10^4$ or more and $300\times10^4$ or less, has a molecular weight distribution Mw/Mn of 1.6 or more and 4.0 or less, has a modification ratio of 30% by mass or more and 80% by mass or less with respect to a total amount of the conjugated diene-based polymer, and includes 5% by mass or more and 50% by mass or less of a component having a molecular weight of 1,000,000 or more and 5,000,000 or less in GPC (gel permeation chromatography), wherein a modification ratio of the component having a molecular weight of 1,000,000 or more and 5,000,000 or less is 90% by mass or more and 100% by mass or less.

8 Claims, No Drawings

MODIFIED CONJUGATED DIENE-BASED POLYMER, POLYMER COMPOSITION, AND RUBBER COMPOSITION

TECHNICAL FIELD

The present invention relates to a modified conjugated diene-based polymer, a polymer composition, and a rubber composition.

BACKGROUND ART

Recently, there are increasing demands for reduction of fuel consumption in vehicles, and improvement of materials of a vehicle tire, particularly, of a tire tread in contact with the ground is required. Heretofore, development of a material having low rolling resistance, namely, a material having a low hysteresis loss property, has been demanded.

In order to reduce the weight of a tire, it is necessary to reduce the thickness of a tread portion of the tire, and there is a demand for a material having high abrasion resistance.

On the other hand, a material used for a tire tread is required, from the viewpoint of safety, to be excellent in wet skid resistance and to have practically sufficient fracture characteristics.

A material meeting such requirements is a rubber material containing a rubber-like polymer and a reinforcing filler such as carbon black or silica. When a rubber material containing silica is used, balance between the low hysteresis loss property and the wet skid resistance can be improved. An attempt has been made to reduce a hysteresis loss by improving dispersibility of silica in a rubber-like polymer through introduction of a functional group having affinity or reactivity with silica into a molecular end of a rubber-like polymer having high mobility, and further by reducing the mobility of the molecular end of the rubber-like polymer through a bond with a silica particle.

For example, Patent Literatures 1 and 2 propose a polymer functionalized through a reaction of a cyclic aza-sila cycle compound with a polymer active end.

Patent Literature 3 proposes a diene-based rubber obtained through a coupling reaction between a polymer active end and a multi-functional silane compound.

CITATION LIST

Patent Literature

Patent Literature 1: Japanese Unexamined Patent Application Publication (Translation of PCT Application) No. 2008-527150
Patent Literature 2: WO11/129425
Patent Literature 3: WO07/114203

SUMMARY OF INVENTION

Technical Problem

Silica has, however, disadvantages of having a hydrophilic surface while carbon black has a hydrophobic surface, having low affinity with a conjugated diene-based rubber, and being inferior in dispersibility to carbon black. Therefore, in the case of adopting silica as a filler, it is necessary to additionally contain a silane coupling agent or the like to improve the dispersibility by imparting a bond between the silica and the conjugated diene-based rubber.

The material in which a functional group having high reactivity with silica is introduced into a molecular end of the conjugated diene-based rubber disadvantageously tends to be degraded in workability, for example, it becomes difficult to knead because a reaction with a silica particle proceeds during a kneading process to increase the viscosity of a resultant rubber composition, or surface coarseness or sheet breakage is easily caused when formed into a sheet after the kneading.

In addition, the material in which a functional group is introduced disadvantageously easily adheres to a metal surface of a mold or the like. Moreover, when such a material is used to obtain a vulcanizate, in particular, used to obtain a vulcanizate containing an inorganic filler such as silica, unfortunately, sufficient abrasion resistance cannot be obtained.

Therefore, an object of the present invention is to provide a modified conjugated diene-based polymer yielding a rubber composition for a tire that has low adherence to a metal surface during processing and during vulcanization, has high abrasion resistance when used to obtain a vulcanizate, and is also excellent in fuel efficiency.

Solution to Problem

The present inventors made earnest studies to solve the above-described problems of the related arts, and as a result, it was found that a modified conjugated diene-based polymer in which a functional group having affinity or reactivity with a filler is introduced into a polymer molecule, the modified conjugated diene-based polymer having a weight average molecular weight and a molecular weight distribution in specific ranges, having a modification ratio in a prescribed range, and having a content of a component having a molecular weight of 1,000,000 or more and 5,000,000 or less in a molecular weight curve obtained by GPC (gel permeation chromatography), and a modification ratio of the component in specific ranges, can solve the above-described problems of the related arts, and thus, the present invention was accomplished.

Specifically, the present invention provides the following:
[1]
A modified conjugated diene-based polymer, wherein the modified conjugated diene-based polymer
has a weight average molecular weight of $20 \times 10^4$ or more and $300 \times 10^4$ or less,
has a molecular weight distribution Mw/Mn of 1.6 or more and 4.0 or less,
has a modification ratio of 30% by mass or more and 80% by mass or less with respect to a total amount of the conjugated diene-based polymer, and
comprises 5% by mass or more and 50% by mass or less of a component having a molecular weight of 1,000,000 or more and 5,000,000 or less in GPC (gel permeation chromatography), wherein
a modification ratio of the component having a molecular weight of 1,000,000 or more and 5,000,000 or less is 90% by mass or more and 100% by mass or less.
[2]
The modified conjugated diene-based polymer according to [1], wherein
a modification ratio of a molecular weight component with a peak top, or a peak top of the largest molecular weight among molecular weights of a plurality of peaks, if present, in GPC is 1.10 times or more a modification ratio of the whole modified conjugated diene-based polymer.

[3]

The modified conjugated diene-based polymer according to [1] or [2], wherein a modification ratio of a molecular weight component having ½ of a molecular weight at a peak top, or a peak top of the largest molecular weight among molecular weights of a plurality of peaks, if present, in GPC is ½ or less of a modification ratio of the whole modified conjugated diene-based polymer.

[4]

The modified conjugated diene-based polymer according to any one of [1] to [3], wherein Mw/Mn in GPC is 2.0 or more and 4.0 or less, and shrinkage factor g' is 0.64 or more and 1.00 or less.

[5]

The modified conjugated diene-based polymer according to any one of [1] to [4], wherein the modified conjugated diene-based polymer comprises 3 mass ppm or more each of nitrogen and silicon, wherein a molar ratio of nitrogen to silicon (nitrogen/silicon) is 1.1 or more and less than 10.

[6]

The modified conjugated diene-based polymer according to any one of [1] to [4], wherein the modified conjugated diene-based polymer comprises 3 mass ppm or more each of nitrogen and silicon, wherein a molar ratio of nitrogen to silicon (nitrogen/silicon) is 0.1 or more and less than 0.9.

[7]

A polymer composition comprising 10% by mass or more of the modified conjugated diene-based polymer according to any one of [1] to [6].

[8]

A rubber composition comprising 100 parts by mass of a rubber-like polymer comprising 10% by mass or more of the modified conjugated diene-based polymer according to any one of [1] to [6], and 5 to 150 parts by mass of a filler.

Advantageous Effects of Invention

According to the present invention, a modified conjugated diene-based polymer yielding a rubber composition for a tire that has low adherence to a metal surface during processing and during vulcanization, has high abrasion resistance when used to obtain a vulcanizate, and is also excellent in fuel efficiency can be provided.

DESCRIPTION OF EMBODIMENTS

Now, an embodiment for practicing the present invention (hereinafter referred to as the "present embodiment") will be described in detail. The following embodiment is illustrative merely, and is not intended to limit the present invention to the following description. The present invention can be appropriately modified within the scope thereof.

[Modified Conjugated Diene-Based Polymer]

A modified conjugated diene-based polymer of the present embodiment has a weight average molecular weight of $20 \times 10^4$ or more and $300 \times 10^4$ or less, has a molecular weight distribution Mw/Mn of 1.6 or more and 4.0 or less, has a modification ratio of 30% by mass or more and 80% by mass or less with respect to the total amount of the conjugated diene-based polymer, and comprises 5% by mass or more and 50% by mass or less of a component having a molecular weight of 1,000,000 or more and 5,000,000 or less in GPC (gel permeation chromatography), wherein the modification ratio of the component having a molecular weight of 1,000,000 or more and 5,000,000 or less is 90% by mass or more and 100% by mass or less.

(Weight Average Molecular Weight)

The weight average molecular weight of the modified conjugated diene-based polymer of the present embodiment is $20 \times 10^4$ or more and $300 \times 10^4$ or less, preferably $40 \times 10^4$ or more and $250 \times 10^4$ or less, and more preferably $50 \times 10^4$ or more and $200 \times 10^4$ or less.

When the weight average molecular weight is $20 \times 10^4$ or more and $300 \times 10^4$ or less, the abrasion resistance obtained when in the form of a vulcanizate is excellent.

The weight average molecular weight of the modified conjugated diene-based polymer can be controlled to the above-described numeric range by adjusting polymerization conditions such as the addition amount of a monomer, the addition amount of a polymerization initiator, and a polymerization time in a polymerization step.

The weight average molecular weight of the modified conjugated diene-based polymer is measured by a method described in examples below.

(Molecular Weight Distribution)

In the modified conjugated diene-based polymer of the present embodiment, the molecular weight distribution Mw/Mn corresponding to a ratio of a weight average molecular weight (Mw) to a number average molecular weight (Mn) is 1.6 or more and 4.0 or less. A modified conjugated diene-based polymer having a molecular weight distribution falling in this range tends to be superior in the workability obtained when used for obtaining a vulcanizate to a polymer having a molecular weight and a modification ratio comparable therewith. Mw/Mn is preferably 1.8 or more and 3.0 or less, and more preferably 1.9 or more and 2.5 or less.

The molecular weight distribution of the modified conjugated diene-based polymer can be controlled to the above-described numeric range by adjusting polymerization conditions such as a polymerization temperature and a polymerization time in a polymerization step, and production by continuous polymerization is more preferred.

The modified conjugated diene-based polymer of the present embodiment comprises 5% by mass or more and 50% by mass or less of a modified conjugated diene-based polymer having a molecular weight of 1,000,000 or more and 5,000,000 or less (hereinafter sometimes referred to as the "specific high molecular weight component" or the "high molecular weight component"). Thus, the abrasion resistance obtained when in the form of a vulcanizate tends to be more excellent. The content of the specific high molecular weight component is preferably 6% by mass or more and 45% by mass or less, and more preferably 7% by mass or more and 40% by mass or less.

For the molecular weight distribution of the modified conjugated diene-based polymer of the present embodiment, it is preferable that the molecular weight curve obtained by GPC has a monomodal shape or has a trapezoidal or multimodal shape for a plurality of peaks, if present. The multimodal shape means a shape in which the height of the lowest part between peaks is 50% or more of the heights of both the peaks. A modified conjugated diene-based polymer having such a molecular weight distribution tends to be excellent in the balance between the low hysteresis loss property and the wet skid resistance.

In order to obtain a modified conjugated diene-based polymer compriseing the specific high molecular weight component as described above in a content falling in the range of 5% by mass or more and 50% by mass or less, for example, the amount of an organomonolithium compound described later to be used as a polymerization initiator may be controlled. In the polymerization step described later, no matter which of continuous polymerization or batch polymerization is employed, a method using a residence time distribution, namely, a method in which a time distribution of a growth reaction is expanded, is effectively selected.

Examples of a specific method for the continuous polymerization include: a method in which a tank reactor equipped with a stirrer is used as a back-mix reactor of a type performing vigorous mixing with a stirrer, and preferably used as a complete mixing reactor, a method in which a part of a tubular reactor is recirculated, a method in which a feeding portion of a polymerization initiator is provided in a monomer inlet or in an inlet disposed in the middle of another polymerization reactor in the vicinity of the monomer inlet, and a method in which a tank reactor and a tubular reactor are used in combination.

In these methods, with a residence time distribution expanded, a polymer component having a long residence time can be obtained as the high molecular weight component.

A specific example of the batch polymerization includes a method in which a polymerization initiator is fed continuously or intermittently from the start to the middle of the polymerization.

In this method, it is regarded that a polymer having been polymerized from the polymerization start when the polymerization initiator is initially fed is obtained as the high molecular weight component and has a different molecular weight from a polymer started to be polymerized later. More specifically, there is a tendency that a polymer having an expanded molecular weight distribution can be obtained by feeding, to a monomer, a polymerization initiator in an amount corresponding to a target molecular weight continuously, for example, between a conversion ratio of 0% by mass and 95% by mass.

When the above-described method is employed, there is a tendency that the activity ratio of a living end of the conjugated diene-based polymer before the reaction step becomes higher, and there is a tendency that a modified conjugated diene-based polymer having a high coupling ratio attained after coupling, namely, a high modification ratio, can be obtained.

Among these methods, the method in which a tank reactor equipped with a stirrer is used as a back-mix reactor of a type performing vigorous mixing with a stirrer is more preferably employed.

Herein, the term "molecular weight" refers to a molecular weight in terms of standard polystyrene obtained by GPC (gel permeation chromatography).

The number average molecular weight, the weight average molecular weight, and the molecular weight distribution can be measured by a method described in examples below.
(Modification Ratio)

In the modified conjugated diene-based polymer of the present embodiment, the modification ratio with respect to the total amount of the conjugated diene-based polymer is 30% by mass or more and 80% by mass or less, preferably 40% by mass or more and 75% by mass or less, and more preferably 50% by mass or more and 70% by mass or less.

In general, a modified conjugated diene-based polymer having a high modification ratio tends to be excellent in the balance between the low hysteresis loss property and the wet skid resistance obtained when in the form of a vulcanizate. On the other hand, such a modified conjugated diene-based polymer tends to be degraded in workability and be inferior in handleability, particularly, due to high adherence to a metal surface.

This is presumably because a high molecular weight component having a high modification ratio has larger interaction with a metal surface than that of a low molecular weight component easily adhering to the metal surface.

Therefore, in the present embodiment, the modified conjugated diene-based polymer is designed such that: the effect of the balance between the low hysteresis loss property and the wet skid resistance ascribable to the modification is obtained by setting the lower limit of the modification ratio to 30% by mass or more; on the other hand, the degradation in workability is suppressed by setting the upper limit of the modification ratio to 80% by mass or less; and as described later, the polymer is prevented from adhering to a metal surface, by controlling the modification ratios of specific molecular weight components.

The modification ratio refers to a content of a polymer component having a specific functional group having affinity or binding reactivity with a filler in the polymer molecule to the total amount of the conjugated diene-based polymer, and is indicated by % by mass.

Examples of the specific functional group having affinity or binding reactivity with a filler preferably include a functional group having a functional group containing a nitrogen atom, a silicon atom or an oxygen atom.

From the viewpoint that a rubber composition in which a rubber-like polymer comprising the modified conjugated diene-based polymer of the present embodiment is combined with a filler is excellent in the balance between the low hysteresis loss property and the wet skid resistance, the modified conjugated diene-based polymer of the present embodiment is preferably a modified conjugated diene-based polymer having the above-described functional group at an end of the polymer. Examples include a polymer in which a functional group having a nitrogen atom is bonded to a polymerization starting end, and/or a modified conjugated diene-based polymer having a terminating end modified with a functional group containing a nitrogen atom, a silicon atom or an oxygen atom.

The modification ratio can be measured by chromatography that can separate a modified component containing the functional group from a non-modified component. Examples of a method using this chromatography include a method in which quantification is performed using a column for gel permeation chromatography with a polar substance, such as silica, which adsorbs the specific functional group, as a filler, and using an internal standard of a non-adsorbed component in comparison.

More specifically, the modification ratio is calculated by obtaining a chromatogram obtained by measurement using a polystyrene-based gel column and a chromatogram obtained by measurement using a silica-based column by using a sample solution comprising the sample and low molecular weight internal standard polystyrene, and based on a difference between these chromatograms, measuring an adsorption amount to the silica column.

Further specifically, the modification ratio can be measured by a method described in Examples.

The modification ratio of the modified conjugated diene-based polymer can be controlled to the above-described numeric range by adjusting polymerization conditions such as a polymerization temperature and a polymerization time in a polymerization step, and modification conditions such as the addition amount of a modifier and a modification time in a modification reaction step.

(Modification Ratio of Specific High Molecular Weight Component)

The present inventor measured modification ratios in respective molecular weight regions in the molecular weight curve obtained by GPC, and thereby found that, depending on a polymer, the modification ratio differs among the molecular weight regions.

It was found that a modified diene-based polymer having a specific structure with more inhomogeneous modification ratios among respective molecular weight regions, particularly, a modified conjugated diene-based polymer having a high modification ratio of the specific high molecular weight component described above, is superior in specific performance to a modified conjugated diene-based polymer having a modification ratio equivalent thereto in which modification ratios are homogenous among respective molecular weight regions.

In the modified conjugated diene-based polymer of the present embodiment, the modification ratio of a high molecular weight component having a molecular weight of 1,000,000 or more and 5,000,000 or less in GPC is 90% by mass or more and 100% by mass or less, preferably 95% by mass or more, and more preferably 98% by mass or more.

A modified conjugated diene-based polymer having a high modification ratio of the high molecular weight component exhibits high abrasion resistance obtained when in the form of a vulcanizate, because the high molecular weight component having a high modification ratio interacts with silica.

The modified conjugated diene-based polymer having a high modification ratio of the high molecular weight component can be obtained by continuous polymerization. Examples of a specific method for the continuous polymerization include: a method in which a tank reactor equipped with a stirrer is used as a back-mix reactor of a type performing vigorous mixing with a stirrer, and preferably used as a complete mixing reactor, a method in which a part of a tubular reactor is recirculated, a method in which a feeding portion of a polymerization initiator is provided in a monomer inlet or in an inlet in the middle of another polymerization reactor in the vicinity of the monomer inlet, and a method in which a tank reactor and a tubular reactor are used in combination. A method in which a tank reactor equipped with a stirrer is used as a complete mixing reactor of a type performing vigorous mixing with a stirrer is preferably employed.

Since these methods do not lower a monomer concentration in the vicinity of a polymerization reactor outlet and suppress the formation of a high molecular weight inactivated polymer, it is considered that the modification ratio of the high molecular weight component having a molecular weight of 1,000,000 or more and 5,000,000 or less in GPC becomes 90% by mass or more and 100% by mass or less.

The modification ratio of each specific molecular weight component can be measured by chromatography that can separate a modified component comprising the functional group from a non-modified component.

Examples of a method using this chromatography include a method in which quantification is performed using a column for gel permeation chromatography with a polar substance, such as silica, which adsorbs the specific functional group, as a filler, and using an internal standard of a non-adsorbed component in comparison.

More specifically, the modification ratio of each molecular weight component is obtained by a method in which a chromatogram obtained by measurement using a polystyrene-based gel column and a chromatogram obtained by measurement using a silica-based column are obtained by using a sample solution comprising the sample and low molecular weight internal standard polystyrene, and based on a difference of each molecular weight component between these chromatograms, an adsorption amount to the silica column is measured. Further specifically, the modification ratio can be measured by a method described in Examples.

(Modification Ratio of Peak Top)

In the present embodiment, the modification ratio of a molecular weight component with a peak top, or a peak top of the largest molecular weight of a peak among molecular weights of a plurality of peaks, if present, in a GPC curve is preferably 1.10 times or more, more preferably 1.15 times or more, and further preferably 1.20 times or more the modification ratio of the whole modified conjugated diene-based polymer.

A modified conjugated diene-based polymer in which the modification ratio of the peak top molecular weight component is higher than the modification ratio of the whole modified conjugated diene-based polymer tends to be excellent in the abrasion resistance obtained when in the form of a vulcanizate.

In order to adjust the modification ratio of the molecular weight component with a peak top, or a peak top of the largest molecular weight of a peak among molecular weights of a plurality of peaks, if present, in a GPC curve to 1.10 times or more the modification ratio of the whole modified conjugated diene-based polymer, adjustment is effectively made such that impurities acting as a polymerization terminator or a chain transfer agent are comprised in an amount larger than usual in a monomer and a solvent to be introduced into a polymerization reactor.

(Modification Ratio of Low Molecular Weight Component)

In the modified conjugated diene-based polymer of the present embodiment, the modification ratio of a component having a molecular weight which is ½ of a molecular weight at a peak top of one peak, if present, or a peak top of the largest molecular weight among molecular weights of a plurality of peaks, if present, in a GPC curve (hereinafter sometimes referred to as the "low molecular weight component") is preferably ½ or less of the modification ratio of the whole modified conjugated diene-based polymer, and more preferably 0.1 times or more and 0.4 times or less the modification ratio of the whole modified conjugated diene-based polymer. In this case, a modified conjugated diene-based polymer excellent in the fluidity of a rubber composition can be obtained because the entanglement of the low molecular weight component is reduced.

In order to obtain a rubber composition having excellent abrasion resistance and fluidity and having low adherence to a metal surface during processing, the above-described modification ratio is particularly preferably 0.3 times or more and 0.5 times or less.

The modified conjugated diene-based polymer of the present embodiment in which the modification ratio of the low molecular weight component described above is ½ or less of the modification ratio of the whole modified conjugated diene-based polymer can be obtained by, for example, a method in which high temperature polymerization is performed, a method in which the number of termination reactions is increased in the middle of the polymerization after achievement of a monomer conversion ratio of 98% or more, a method in which a residence time distribution is expanded by forced mixing in the polymerization system, or a method using a coupling reaction of two or more molecules using a coupling agent having a modifying group.

According to the modified conjugated diene-based polymer of the present embodiment, a modified conjugated diene-based polymer is obtained which exerts seemingly contradictory effects of exhibiting low adherence to a metal surface during processing and during vulcanization and exhibiting high abrasion resistance obtained when in the form of a vulcanizate.

The mechanism of obtaining such a modified conjugated diene-based polymer is not necessarily clear, but is presumed as follows.

In general, a modifier residue has a polar group containing nitrogen, phosphorus, oxygen or the like and thus has large interaction with a metal surface. When the modification ratio of the low molecular weight component described above is high, the low molecular weight component bonded to a modifier residue is abundant so that the low molecular weight component having the modifier residue easily adheres to a metal surface of a roll or the like during kneading. When the low molecular weight component adheres to a metal surface, the polymer easily remains adhering to the metal because the low molecular weight component has a small effect of entangling polymers. By contrast, in the case of adjusting the modification ratio of the high molecular weight component described above to 90% by mass or more and 100% by mass or less while setting the modification ratio of the whole modified conjugated diene-based polymer to the range of 30% by mass or more and 80% by mass or less, the high molecular weight component bonded to a modifier residue is abundant so that the high molecular weight component having the modifier residue easily adheres to a metal surface of a roll or the like during kneading. However, the high molecular weight component has a large effect of entangling molecular chains. Thus, the polymer is presumably drawn into the high molecular chain and becomes difficult to leave on the metal surface.

(Configuration of Modified Conjugated Diene-based Polymer)

The modified conjugated diene-based polymer of the present embodiment is preferably a modified conjugated diene-based polymer in which a modifier residue having a functional group having affinity or reactivity with a filler is bonded to a polymerization starting end and/or terminating end.

Namely, the modified conjugated diene-based polymer of the present embodiment is preferably composed of a modifier residue having the functional group and a conjugated diene-based polymer chain.

<Modifier Residue>

The modifier residue in the modified conjugated diene-based polymer of the present embodiment is a constituent unit of the modified conjugated diene-based polymer bonded to the conjugated diene-based polymer chain, and is, for example, a constituent unit derived from a modifier and generated through a reaction between the conjugated diene-based polymer and the modifier described later.

The modifier residue has a specific functional group having affinity or binding reactivity with a filler.

When the modified conjugated diene-based polymer of the present embodiment is a modified conjugated diene-based polymer in which the functional group is bonded to a polymerization starting end, the modified conjugated diene-based polymer can be obtained through a polymerization reaction using a polymerization initiator having the functional group.

Preferred Embodiment Regarding Functional Group

Examples of the above-described functional group having affinity or binding reactivity with a filler preferably include a functional group containing a nitrogen atom or a silicon atom.

More preferably, the ratio of the mole number of a nitrogen atom to the mole number of a silicon atom, namely, the N/Si molar ratio, is preferably 0.1 to 10.0, and more preferably 0.2 to 7.0.

When the N/Si molar ratio falls in this range, the affinity with a silica-based filler is particularly good. A rubber composition comprising a silica-based filler has small hysteresis loss and exerts good performance as a rubber composition for a low fuel consumption tire.

Examples of the functional group containing a silicon atom include, but are not limited to, a methoxysilyl group, an ethoxysilyl group, and a propoxysilyl group.

Examples of the functional group containing a nitrogen atom include, but are not limited to, a secondary amino group and a tertiary amino group.

The modified conjugated diene-based polymer of the present embodiment is preferably a modified conjugated diene-based polymer having a functional group containing a nitrogen atom in the polymer molecule. In such a case, the functional group containing a nitrogen atom is particularly preferably a functional group containing secondary amine in which the nitrogen atom is at least of —NH— type. In this case, a rubber composition containing a silica-based filler and carbon black as a filler has small hysteresis loss and exerts good performance as a rubber composition for a low fuel consumption tire.

When the modifier residue has a silicon atom, it is preferable that at least one silicon atom constitutes an alkoxysilyl group having 1 to 20 carbon atoms or a silanol group. This tends to improve the dispersibility of a filler in a rubber composition and improve fuel efficiency.

In the modified conjugated diene-based polymer of the present embodiment, ends of a plurality of the conjugated diene-based polymer chains may be bonded to one silicon atom. Alternatively, an end of the conjugated diene-based polymer chain and an alkoxy group or a hydroxyl group may be bonded to one silicon atom, so that the one silicon atom can constitute an alkoxysilyl group or a silanol group.

(Monomer Constituting Conjugated Diene-Based Polymer)

The conjugated diene-based polymer before modification of the modified conjugated diene-based polymer of the present embodiment is obtained by polymerizing at least a conjugated diene compound, and is obtained, if necessary, by copolymerizing both a conjugated diene compound and a vinyl-substituted aromatic compound.

The conjugated diene compound is not especially limited as long as it is a polymerizable monomer, and is preferably a conjugated diene compound containing 4 to 12 carbon atoms per molecule, and more preferably a conjugated diene compound containing 4 to 8 carbon atoms. Examples of such a conjugated diene compound include, but are not limited to, 1,3-butadiene, isoprene, 2,3-dimethyl-1,3-butadiene, 1,3-pentadiene, 3-methyl-1,3-pentadiene, 1,3-hexadiene and 1,3-heptadiene. Among these, 1,3-butadiene and isoprene are preferred from the viewpoint of industrial availability. One of these compounds may be singly used, or two or more of these may be used together.

The vinyl-substituted aromatic compound is not especially limited as long as it is a monomer copolymerizable with the conjugated diene compound, and is preferably a monovinyl aromatic compound. Examples of the monovinyl aromatic compound include, but are not limited to, styrene, p-methylstyrene, α-methylstyrene, vinyl ethyl benzene, vinyl xylene, vinyl naphthalene and diphenyl ethylene. Among these, styrene is preferred from the viewpoint of industrial availability. One of these compounds may be singly used, or two or more of these may be used together.

Preferred Embodiment for SBR

When the modified conjugated diene-based polymer of the present embodiment is a butadiene-styrene random copolymer (SBR), the amount of bound styrene is preferably 5% by mass to 50% by mass, and the amount of bound vinyl is preferably 10% by mass to 75% by mass. When these amounts fall in the above-described ranges, SBR for a tire as well as adaptable to any use is industrially obtained.

In particular, when the amount of bound styrene is 25% by mass to 45% by mass and the amount of bound vinyl is 18% by mass to 30% by mass, a rubber composition having small hysteresis loss and excellent abrasion resistance is obtained.

When the amount of bound styrene is 18% by mass to 28% by mass and the amount of bound vinyl is 45% by mass to 65% by mass, a rubber composition compounded with a natural rubber is obtained as a rubber composition for a fuel efficient tire having small hysteresis loss and excellent strength.

The amount of bound styrene refers to % by mass of styrene in all monomer components, and the amount of bound vinyl refers to % by mass of a vinyl bond component in butadiene components.

(Glass Transition Temperature)

The glass transition temperature (Tg) of the modified conjugated diene-based polymer of the present embodiment is a temperature at which the molecular chain of the modified conjugated diene-based polymer starts a rotational motion, and largely influences fuel efficiency and wet grip characteristics.

When Tg is low, the fuel efficiency is good. When Tg is high, the wet grip characteristics is improved.

When the modified conjugated diene-based polymer is used for a fuel efficient tire, Tg is preferably −20° C. or more and 0° C. or less. Thus, the wet grip characteristics and the rigidity are exceedingly good. This modified conjugated diene-based polymer is exceedingly useful for a tire for high performance and a tire for ultrahigh performance.

Another preferred form of the modified conjugated diene-based polymer of the present embodiment has Tg of −50° C. or more and less than −20° C. Thus, the balance between the fuel efficiency and the wet grip characteristics is exceedingly excellent. This modified conjugated diene-based polymer is exceedingly useful for a tire for summer and a tire for all seasons.

A further alternative preferred form of the modified conjugated diene-based polymer of the present embodiment has Tg of −70° C. or more and less than −50° C. Thus, the low temperature performance and the abrasion resistance are exceedingly good. This modified conjugated diene-based polymer is exceedingly useful for a tire for winter. In order to improve the abrasion resistance, it is used as a compounding material for various tire treads.

The Tg of the modified conjugated diene-based polymer of the present embodiment can be measured in accordance with ISO 22768: 2006.

(Preferred Form of SBR)

When the modified conjugated diene-based polymer of the present embodiment is a butadiene-styrene random copolymer (SBR), a large proportion of a styrene unit is preferably present singly, and a long chain is preferably few in number.

Specifically, when the modified conjugated diene-based polymer is a butadiene-styrene copolymer and the copolymer is decomposed by employing a method through ozonolysis known as a method of Tanaka et al., (Polymer, 22, 1721 (1981)) to analyze a styrene chain distribution by GPC, it is preferable that the amount of isolated styrene to the whole amount of bound styrene is 40% by mass or more, and that the amount of a chain styrene structure consisting of 8 or more chained styrene is 5.0% by mass or less. In this case, a rubber composition for a fuel efficient tire having small hysteresis loss and excellent performance is obtained in particular.

(Hydrogenated Conjugated Diene-Based Polymer)

In the modified conjugated diene-based polymer of the present embodiment may be obtained by further hydrogenating the modified conjugated diene-based polymer or a conjugated diene-based polymer before modification in an inert solvent. Thus, all or some of double bonds can be converted into saturated hydrocarbon. In such a case, heat resistance and weather resistance can be improved so as to prevent degradation of a product when processed at a high temperature, and the dynamic performance as a rubber tends to be improved. As a result, further excellent performance can be exhibited in various uses including vehicle use.

A hydrogenation rate of an unsaturated double bond based on a conjugated diene compound can be arbitrarily selected in accordance with the purpose, and is not especially limited. When it is used in the form of a vulcanizate, a double bond of a conjugated diene portion preferably partially remains. From this viewpoint, a rate of hydrogenation of the conjugated diene portion in the conjugated diene-based polymer is preferably 3.0% by mole or more and 70% by mole or less, more preferably 5.0% by mole or more and 65% by mole or less, and further preferably 10% by mole or more and 60% by mole or less. In particular, when a vinyl group is selectively hydrogenated, the heat resistance and the dynamic performance tend to be improved. The hydrogenation rate can be obtained using a nuclear magnetic resonance apparatus (NMR).

(Oil-Extended Polymer and Mooney Viscosity)

The modified conjugated diene-based polymer of the present embodiment may be made into an oil-extended polymer additionally comprising an extender oil. The modified conjugated diene-based polymer of the present embodiment may be non-oil-extended or oil-extended.

From the viewpoint of the workability obtained when used for obtaining a vulcanized rubber composition and the abrasion resistance obtained when in the form of a vulcanizate, the Mooney viscosity of the modified conjugated diene-based polymer of the present embodiment measured at 100° C. is preferably 20 or more and 100 or less, and more preferably 30 or more and 80 or less. The Mooney viscosity of the modified conjugated diene-based polymer can be measured by a method described in examples below.

(Nitrogen and Silicon Contents)

From the viewpoint of improvement in fuel efficiency, each of the contents of nitrogen and silicon in the modified conjugated diene-based polymer of the present embodiment is preferably 3 mass ppm or more, more preferably 7 mass ppm or more, and further preferably 10 mass ppm or more.

It is considered that the modified conjugated diene-based polymer of the present embodiment is physically adsorbed to a filler through nitrogen and chemically bonded to the filler through silicon when kneaded with the filler. When the contents fall in the above numeric range, a rubber composition excellent in hysteresis loss property is obtained.

For the modified conjugated diene-based polymer of the present embodiment, the molar ratio between nitrogen and silicon to be contained is important. The molar ratio of nitrogen to silicon (N/Si) is preferably 1.1 or more and less than 10 from the viewpoint that silica can be dispersed in a short period of time during kneading, and is more preferably 1.3 or more and 7 or less, and further preferably 1.5 or more and 5 or less.

The reason why the N/Si molar ratio that falls in the above-described range is preferred is presumably that the molar ratio of nitrogen to silicon is preferably equimolar or more because the physical adsorption through nitrogen has a faster reaction rate than that of the chemical bond through silicon.

Another preferred form of the modified conjugated diene-based polymer of the present embodiment has a molar ratio of nitrogen to silicon (N/Si) of 0.1 or more and less than 0.9. Thus, silica can be dispersed in a short period of time during kneading. In such a case, the ratio is more preferably 0.2 or more and 0.75 or less, and further preferably 0.3 or more and 0.6 or less.

The reason why the molar ratio of nitrogen to silicon of 0.1 or more and less than 0.9 is preferred is presumably that the molar ratio of nitrogen to silicon is preferably less than equimolar because the bond of the physical adsorption through nitrogen is stronger than the chemical bond through silicon. In this case, the content of silicon is preferably 7 mass ppm or more.

The contents of nitrogen and silicon and the molar ratio of nitrogen to silicon (nitrogen/silicon) in the modified conjugated diene-based polymer of the present embodiment may be controlled by adjusting the type or amount of the modifier to be used in the modification reaction of the conjugated diene-based polymer.

For example, the molar ratio of nitrogen to silicon in the modified conjugated diene-based polymer may be elevated by using, at a prescribed content, a modifier appropriate for the desired contents of nitrogen and silicon, or elevating the molar ratio of nitrogen to silicon in the modifier.

(Shrinkage Factor)

A preferred form of the modified conjugated diene-based polymer of the present embodiment is a modified conjugated diene-based polymer having a shrinkage factor (g') of 0.86 or more and 0.99 or less measured using 3D-GPC.

When the shrinkage factor (g') of the modified conjugated diene-based polymer of the present embodiment falls in the above-described range, the tensile strength tends to be excellent.

The shrinkage factor (g') serves as an index of a branched structure of the modified conjugated diene-based polymer, and a modified conjugated diene-based polymer having a shrinkage factor (g') of 0.86 or more and 0.99 or less is a modified conjugated diene-based polymer in which the number of branches in one molecule of the modified diene-based polymer is three or less branches. In such a case, the shrinkage factor (g') is more preferably 0.88 or more and 0.99 or less, and further preferably 0.90 or more and 0.98 or less.

As a method for obtaining the modified conjugated diene-based polymer, for example, a method is effective in which a modifier having three or less reactive sites for a living active end is added at a mole number of ⅓ or more with respect to the total mole number of a polymerization initiator to obtain a modified conjugated diene-based polymer having three or less branches.

Another preferred form of the modified conjugated diene-based polymer of the present embodiment has a shrinkage factor (g') of 0.64 or more and 1.00 or less measured using 3D-GPC.

Such a modified conjugated diene-based polymer tends to reduce the viscosity of a rubber composition additionally comprising a filler and be excellent in workability.

The shrinkage factor (g') serves as an index of a branched structure of the modified conjugated diene-based polymer, and a modified conjugated diene-based polymer having a shrinkage factor (g') of 0.64 or more and 1.00 or less is a modified conjugated diene-based polymer in which the number of branches in one molecule of the modified conjugated diene-based polymer is six or less branches.

As a method for obtaining the modified conjugated diene-based polymer, for example, a method is effective in which a modifier having six or less reactive sites for a living active end is added at a mole number of ⅙ or more with respect to the total mole number of a polymerization initiator to obtain a modified conjugated diene-based polymer having six or less branches.

In the modified conjugated diene-based polymer of the present embodiment, Mw/Mn in GPC is preferably 2.0 or more and 4.0 or less, in addition to the above-described shrinkage factor (g') of 0.64 or more and 1.00 or less. Thus, the viscosity of a composition additionally comprising a filler tends to be drastically reduced, and an effect of largely improving workability is obtained.

A further alternative preferred form of the modified conjugated diene-based polymer of the present embodiment has a shrinkage factor (g') of 0.30 or more and less than 0.86 measured using 3D-GPC.

Such a modified conjugated diene-based polymer drastically reduces the viscosity of a rubber composition additionally comprising a filler and is exceedingly excellent in workability.

The shrinkage factor (g') serves as an index of a branched structure of the modified conjugated diene-based polymer, and a modified conjugated diene-based polymer having a shrinkage factor (g') of 0.30 or more and less than 0.86 is a modified conjugated diene-based polymer in which the number of branches in one molecule of the modified conjugated diene-based polymer is four or more branches.

As a method for obtaining the modified conjugated diene-based polymer, for example, a method is effective in which a modifier having four or more reactive sites for a living active end is added at a mole number of ¼ or less with respect to the total mole number of a polymerization initiator to obtain a modified conjugated diene-based polymer having four or more branches.

In the modified conjugated diene-based polymer of the present embodiment, the shrinkage factor (g') measured using 3D-GPC is more preferably 0.30 or more and less than 0.70.

Such a modified conjugated diene-based polymer more reduces the viscosity of a rubber composition additionally comprising a filler and is further excellent in workability.

The shrinkage factor (g') serves as an index of a branched structure of the modified conjugated diene-based polymer, and a modified conjugated diene-based polymer having a shrinkage factor (g') of 0.30 or more and less than 0.70 is a modified conjugated diene-based polymer in which the number of branches in one molecule of the modified conjugated diene-based polymer is five or more branches.

As a method for obtaining the modified conjugated diene-based polymer, for example, a method is effective in which a modifier having five or more reactive sites for a living active end is added at a mole number of ⅕ or less with respect to the total mole number of a polymerization initiator to obtain a modified conjugated diene-based polymer having five or more branches.

The shrinkage factor (g') measured by measurement according to a GPC-light scattering method with a viscosity detector (hereinafter sometimes simply referred to as the "GPC-light scattering measurement with a viscosity detector" or the "3D-GPC measurement") also serves as an index of the number of branches of the modified conjugated diene-based polymer. For example, as the shrinkage factor (g') is decreased, the number of branches of the modified conjugated diene-based polymer (for example, the number of branches of a star polymer (also referred to as "the number of arms of a star polymer")) tends to be increased.

In the case of comparing modified conjugated diene-based polymers having an equal absolute molecular weight, as the number of branches of the modified conjugated diene-based polymer is larger, the shrinkage factor (g') is smaller. In this case, the shrinkage factor (g') can be used as an index of a branching degree.

The shrinkage factor (g') is measured using the 3D-GPC measurement. When constants (K and α) in a relational expression of an intrinsic viscosity and a molecular weight ($[\eta]=KM^a$ ($[\eta]$: intrinsic viscosity, M: molecular weight) are defined as log K=−3.883 and α=0.771, 1000 to 20000000 are input as the range of the molecular weight M to prepare the relation between a standard intrinsic viscosity $[\eta]_0$ and the molecular weight M.

An intrinsic viscosity $[\eta]$ at each molecular weight M of a sample obtained by the 3D-GPC measurement with respect to this standard intrinsic viscosity $[\eta]_0$ is represented by $[\eta]/[\eta]_0$ as the relation of the intrinsic viscosity $[\eta]$ to the standard intrinsic viscosity $[\eta]_0$ and calculated as to the respective molecular weights M, and an average thereof is defined as the shrinkage factor (g').

More preferably, the shrinkage factor (g') can be measured by a method described in examples below.

(Preferred Structure of Modified Conjugated Diene-Based Polymer)

The modified conjugated diene-based polymer of the present embodiment is preferably represented by the following general formula (I):

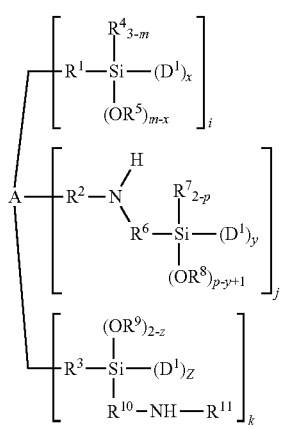

In formula (I), $D^1$ represents a diene-based polymer chain, $R^1$ to $R^3$ each independently represent a single bond or an alkylene group having 1 to 20 carbon atoms, $R^4$ and $R^7$ each independently represent an alkyl group having 1 to 20 carbon atoms, $R^5$, $R^8$ and $R^9$ each independently represent a hydrogen atom or an alkyl group having 1 to 20 carbon atoms, $R^6$ and $R^{10}$ each independently represent an alkylene group having 1 to 20 carbon atoms, and $R^{11}$ represents a hydrogen atom or an alkyl group having 1 to 20 carbon atoms.

m and x each represent an integer of 1 to 3, x≤m, p represents 1 or 2, y represents an integer of 1 to 3, y (p+1), and z represents an integer of 1 or 2.

Each of $D^1$, $R^1$ to $R^{11}$, m, p, x, y and z, if present in a plural number, is respectively independent.

Furthermore, i represents an integer of 0 to 6, j represents an integer of 0 to 6, k represents an integer of 0 to 6, (i+j+k) is an integer of 1 to 10, and ((x×i)+(y×j)+(z×k)) is an integer of 1 to 30.

A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen. However, when (i+j+k) is 1, A may be absent. The modified conjugated diene-based polymer having the structure of formula (I) tends to be more excellent in the balance between the low hysteresis loss property and the wet skid resistance and the abrasion resistance obtained when in the form of a vulcanizate.

In the modified conjugated diene-based polymer of the present embodiment, A in the above-described formula (I) is preferably represented by any one of the following general formulas (II) to (V):

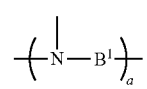

In formula (II), $B^1$ represents a single bond or a hydrocarbon group having 1 to 20 carbon atoms, a represents an integer of 1 to 10, and $B^1$, if present in a plural number, is respectively independent.

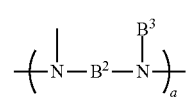

In formula (III), $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent.

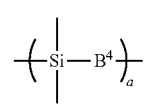

In formula (IV), $B^4$ represents a single bond or a hydrocarbon group having 1 to 20 carbon atoms, a represents an integer of 1 to 10, and $B^4$, if present in a plural number, is respectively independent.

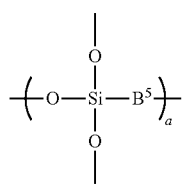

(V)

In formula (V), $B^5$ represents a single bond or a hydrocarbon group having 1 to 20 carbon atoms, a represents an integer of 1 to 10, and $B^5$, if present in a plural number, is respectively independent. Thus, the balance between the low hysteresis loss property and the wet skid resistance and the abrasion resistance obtained when in the form of a vulcanizate tend to be more excellent. Such a polymer tends to be practically more easily available.

[Method for Producing Modified Conjugated Diene-Based Polymer]

A method for producing the modified conjugated diene-based polymer of the present embodiment preferably includes a polymerization step of polymerizing at least a conjugated diene compound using an organomonolithium compound as a polymerization initiator to give a conjugated diene-based polymer, and a modification reaction step of reacting the conjugated diene-based polymer with a modifier having a bonding group reactive to an active end of the conjugated diene-based polymer and further having a specific functional group having affinity or binding reactivity with a filler.

(Polymerization Step)

In a preferred mode of the polymerization step in the method for producing the modified diene-based polymer of the present embodiment, using an organomonolithium compound as a polymerization initiator, at least a conjugated diene compound is polymerized to give a conjugated diene-based polymer.

In the polymerization step, the polymerization is preferably performed by polymerization through a growth reaction by living anionic polymerization, and thus, a conjugated diene-based polymer having an active end is obtained, and there is a tendency that a modified diene-based polymer having a high modification ratio can be obtained.

The modified diene-based polymer of the present embodiment is a modified diene-based polymer having a specific structure with inhomogeneous modification ratios among respective molecular weight regions in the molecular weight curve obtained by GPC.

In the modified conjugated diene-based polymer of the present embodiment, the modification ratio of the component having a molecular weight of 1,000,000 or more and 5,000,000 or less (high molecular weight component) in GPC is 90% by mass or more and 100% by mass or less.

The modification ratio of the high molecular weight component described above is preferably 1.10 times or more the modification ratio of the whole modified conjugated diene-based polymer.

The modification ratio of the low molecular weight component described above is preferably ½ or less of the modification ratio of the whole modified conjugated diene-based polymer.

Such a modified conjugated diene-based polymer in which the modification ratios of the specific molecular weight regions are specific modification ratios is obtained by a polymerization method in which the termination of a growth reaction, or chain transfer is controlled.

Specifically, the modified conjugated diene-based polymer can be produced by use of, for example, a method in which impurities acting as a polymerization terminator or a chain transfer agent are comprised in an amount larger than usual in a monomer and a solvent to be introduced into a polymerization reactor, a method in which the polymerization is performed at a high temperature, a method in which the number of termination reactions in the middle of the polymerization at a monomer conversion ratio of 98% or more is increased, or a method in which the modification ratio of the high molecular weight component is elevated through the use of a coupling reaction of two or more molecules using a coupling agent having a modifying group.

From the viewpoint described above, total impurities in the monomer components to be used are preferably of 50 ppm to 300 ppm, and the content concentrations (masses) of impurities such as allenes, acetylenes, and primary and secondary amines are preferably 20 ppm or more and more preferably 30 ppm or more of the allenes, preferably 20 ppm or more and more preferably 30 ppm or more of the acetylenes, and preferably 5 ppm or more (in terms of a total nitrogen content) of the primary and secondary amines.

Examples of the allenes include propadiene and 1,2-butadiene.

Examples of the acetylenes include ethyl acetylene and vinyl acetylene.

Examples of the primary and secondary amines include methylamine and dimethylamine.

For performing the polymerization method in which the termination of a growth reaction, or chain transfer is controlled, it is preferable to control a polymerization temperature and control a monomer conversion ratio. The polymerization temperature is preferably a temperature at which the living anionic polymerization proceeds, and is preferably 75° or more and 110° C. or less, and more preferably 80° C. or more and 100° C. or less.

The reaction with a modifier is preferably performed at a conversion ratio of 98% or more, and preferably 99% or more, of all monomers.

The conjugated diene-based polymer obtained by the polymerization step may be a random copolymer or a block copolymer. In order to form the conjugated diene-based polymer as a rubber-like polymer, the conjugated diene compound is used in an amount of preferably 40% by mass or more and more preferably 55% by mass or more with respect to the amount of all monomers used in the conjugated diene-based polymer.

Examples of the random copolymer include, but are not limited to, a random copolymer comprising two or more conjugated diene compounds such as a butadiene-isoprene random copolymer, and a random copolymer comprising conjugated diene and the vinyl-substituted aromatic compound such as a butadiene-styrene random copolymer, an isoprene-styrene random copolymer or a butadiene-isoprene-styrene random copolymer.

A composition distribution of each monomer comprised in a copolymer chain is not especially limited, and examples include a completely random copolymer whose composition is almost statistically random, and a tapered (gradient) random copolymer whose composition is distributed in a tapered manner. A bonding mode of the conjugated diene, namely, the composition of a 1,4-bond, a 1,2-bond or the like may be homogeneous or distributed.

Examples of the block copolymer include, but are not limited to, a two-block (diblock) copolymer consisting of two blocks, a three-block (tri-block) copolymer consisting of three blocks, and a four-block (tetra-block) copolymer consisting of four blocks. A polymer constituting every block may be a polymer containing one monomer or a copolymer containing two or more monomers. Assuming that a polymer block containing 1,3-butadiene is expressed as "B", a copolymer of 1,3-butadiene and isoprene is expressed as "B/I", a copolymer of 1,3-butadiene and styrene is expressed as "B/S" and a polymer block containing styrene is expressed as "S", the block copolymer is expressed as a B-B/I two-block copolymer, a B-B/S two-block copolymer, a S-B two-block copolymer, a B-B/S-S three-block copolymer, a S—B-S three-block copolymer, a S—B-S-B four-block copolymer or the like.

In the above-described formula, there is no need to always clearly define a boundary between blocks. When one polymer block is a copolymer containing two monomers, each monomer may be distributed homogeneously or in a tapered manner in the block.

<Polymerization Initiator>

As the polymerization initiator, at least an organomonolithium compound is preferably used.

Examples of the organomonolithium compound include, but are not limited to, a low molecular weight compound and an organomonolithium compound of a solubilized oligomer. Another example of the organomonolithium compound includes a compound having, as a bonding mode between an organic group and lithium therein, a carbon-lithium bond, a nitrogen-lithium bond or a tin-lithium bond.

The amount of the organomonolithium compound to be used as a polymerization initiator is preferably determined on the basis of the molecular weight of the objective conjugated diene-based polymer or modified conjugated diene-based polymer.

There is a tendency that a ratio of the amount of a monomer such as the conjugated diene compound to be used to the amount of the polymerization initiator to be used relates to the degree of polymerization, and relates to the number average molecular weight and/or the weight average molecular weight. Accordingly, in order to increase the molecular weight of the conjugated diene-based polymer, adjustment may be made to reduce the amount of the polymerization initiator, and in order to reduce the molecular weight, the adjustment may be made to increase the amount of the polymerization initiator.

The organomonolithium compound as a polymerization initiator is preferably an alkyl lithium compound having a substituted amino group or dialkylamino lithium. In the case of using any of these compounds, a conjugated diene-based polymer having a nitrogen atom containing an amino group at a polymerization starting end is obtained.

The substituted amino group refers to an amino group having no active hydrogen or having a structure in which active hydrogen is protected.

Examples of an alkyl lithium compound containing an amino group having no active hydrogen include, but are not limited to, 3-dimethylaminopropyl lithium, 3-diethylaminopropyl lithium, 4-(methylpropylamino)butyl lithium and 4-hexamethyleneiminobutyl lithium.

Examples of an alkyl lithium compound containing an amino group having a structure in which active hydrogen is protected include, but are not limited to, 3-bistrimethylsilylaminopropyl lithium and 4-trimethylsilylmethylaminobutyl lithium.

Examples of the dialkylamino lithium include, but are not limited to, lithium dimethylamide, lithium diethylamide, lithium dipropylamide, lithium dibutylamide, lithium di-n-hexylamide, lithium diheptylamide, lithium diisopropylamide, lithium dioctylamide, lithium-di-2-ethylhexylamide, lithium didecylamide, lithium ethylpropylamide, lithium ethylbutylamide, lithium ethylbenzylamide, lithium methylphenetylamide, lithium hexamethyleneimide, lithium pyrrolidide, lithium piperidide, lithium heptamethyleneimide, lithium morpholide, 1-lithioazacyclooctane, 6-lithio-1,3,3-trimethyl-6-azabicyclo[3.2.1] octane and 1-lithio-1,2,3,6-tetrahydropyridine.

Such an organomonolithium compound having a substituted amino group can be reacted with a small amount of a polymerizable monomer, such as 1,3-butadiene, isoprene or styrene, to be used as an organomonolithium compound of a soluble oligomer.

The organomonolithium compound is preferably an alkyl lithium compound. In the case of using the compound, a conjugated diene-based polymer having an alkyl group at a polymerization starting end can be obtained.

Examples of the alkyl lithium compound include, but are not limited to, n-butyllithium, sec-butyllithium, tert-butyllithium, n-hexyllithium, benzyllithium, phenyllithium and stilbene lithium.

From the viewpoint of the industrial availability and the controllability of the polymerization reaction, the alkyl lithium compound is preferably n-butyllithium or sec-butyllithium.

One of these organomonolithium compounds may be singly used, or two or more of these may be used together.

Alternatively, the organomonolithium compound may be used together with another organic metal compound.

Examples of the organic metal compound include, but are not limited to, alkaline earth metal compounds, other alkaline metal compounds and other organic metal compounds.

Examples of the alkaline earth metal compounds include, but are not limited to, organic magnesium compounds, organic calcium compounds and organic strontium compounds. In addition, the examples include alkoxide, sulfonate, carbonate and amide compounds of the alkaline earth metals. Examples of the organic magnesium compounds include, but are not limited to, dibutyl magnesium and ethyl butyl magnesium.

Examples of the other organic metal compounds include organic aluminum compounds.

Examples of the polymerization reaction mode employed in the polymerization step include, but are not limited to, batch and continuous polymerization reaction modes.

In the continuous mode, one reactor or two or more connected reactors can be used. As a reactor for the continuous mode, for example, a tank or tubular reactor equipped with a stirrer is used. It is preferable, in the continuous mode, that a monomer, an inert solvent and a polymerization initiator are continuously fed to the reactor, a polymer solution comprising a polymer is obtained in the reactor, and the polymer solution is continuously discharged.

As a reactor for the batch mode, for example, a tank reactor equipped with a stirrer is used. It is preferable, in the batch mode, that a monomer, an inert solvent and a polymerization initiator are fed, the monomer is continuously or intermittently additionally fed if necessary during the polymerization, a polymer solution comprising a polymer is obtained in the reactor, and the polymer solution is discharged after completing the polymerization.

In order to obtain a conjugated diene-based polymer having an active end at a high ratio in the polymerization step of the method for producing the modified conjugated diene-based polymer of the present embodiment, the continuous polymerization reaction mode in which a polymer can be continuously discharged to be supplied to a next reaction in a short period of time is preferably employed.

In the polymerization step, the polymerization is performed preferably in an inert solvent.

Examples of the inert solvent include hydrocarbon-based solvents such as saturated hydrocarbon and aromatic hydrocarbon.

Examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon comprising a mixture of any of these.

Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification ratio tends to be obtained.

In the polymerization step, a polar compound may be added. Thus, there is a tendency that an aromatic vinyl compound can be randomly copolymerized with the conjugated diene compound, and can be used also as a vinylation agent for controlling a microstructure of a conjugated diene portion. There is a tendency that it is advantageous for acceleration of the polymerization reaction and the like.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxolanyl) propane; tertiary amine compounds such as tetramethylethylenediamine, dipiperidinoethane, trimethylamine, triethylamine, pyridine and quinuclidine; alkaline metal alkoxide compounds such as potassium-tert-amylate, potassium-tert-butylate, sodium-tert-butylate and sodium amylate; and phosphine compounds such as triphenylphosphine.

One of these polar compounds may be singly used, or two or more of these may be used together.

The amount of the polar compound to be used is not especially limited but can be selected in accordance with the purpose or the like, and is preferably 0.01 mol or more and 100 mol or less per mol of the polymerization initiator. The polar compound can be used, as a microstructure modifier for a conjugated diene portion of the polymer, namely, a vinylation agent, in an appropriate amount in accordance with a desired amount of bound vinyl.

There is a tendency that many polar compounds simultaneously have an effective randomizing effect in copolymerization of a conjugated diene compound and an aromatic vinyl compound, and can be used as a modifier for the distribution of the aromatic vinyl compound and the amount of a styrene block.

As a method for randomizing the conjugated diene compound and the aromatic vinyl compound, for example, a method as described in Japanese Unexamined Patent Application Publication No. S59-140211 in which a copolymerization reaction is started with the whole amount of styrene and a part of 1,3-butadiene with the rest of 1,3-butadiene intermittently added during the copolymerization reaction may be employed.

The conjugated diene-based polymer obtained by the polymerization step before the modification reaction step described later has a Mooney viscosity, measured at 110° C., of preferably 10 or more and 90 or less, more preferably 15 or more and 85 or less, and further preferably 20 or more and 60 or less.

When the Mooney viscosity of the conjugated diene-based polymer falls in the above-described range, the modified conjugated diene-based polymer of the present embodiment tends to be excellent in the workability and the abrasion resistance.

The amount of bound conjugated diene in the conjugated diene-based polymer or the modified conjugated diene-based polymer of the present embodiment is not especially limited, and is preferably 40% by mass or more and 100% by mass or less, and more preferably 55% by mass or more and 80% by mass or less.

The amount of bound aromatic vinyl in the conjugated diene-based polymer or the modified conjugated diene-based polymer of the present embodiment is not especially limited, and is preferably 0% by mass or more and 60% by mass or less, and more preferably 20% by mass or more and 45% by mass or less.

When the amount of bound conjugated diene and the amount of bound aromatic vinyl respectively fall in the above-described ranges, the balance between the low hysteresis loss property and the wet skid resistance, the fracture characteristics and the abrasion resistance obtained when in the form of a vulcanizate, tend to be more excellent.

Here, the amount of bound aromatic vinyl can be measured using ultraviolet absorption of a phenyl group, and based on this, the amount of bound conjugated diene can be also obtained. Specifically, these amounts can be measured in accordance with a method described in the examples below.

In the conjugated diene-based polymer or the modified conjugated diene-based polymer of the present embodiment, the amount of bound vinyl in a conjugated diene bond unit is not especially limited, and is preferably 10% by mole or more and 75% by mole or less, and more preferably 20% by mole or more and 65% by mole or less.

When the amount of bound vinyl falls in the above-described range, the balance between the low hysteresis loss property and the wet skid resistance obtained when in the form of a vulcanizate, the abrasion resistance and the fracture strength tend to be more excellent.

Here, when the modified conjugated diene-based polymer is a copolymer of butadiene and styrene, the amount of bound vinyl (the amount of a 1,2-bond) in a butadiene bond unit can be obtained by Hampton method (R. R. Hampton, Analytical Chemistry, 21, 923 (1949)). Specifically, it can be measured by a method described in the examples below.

As for the microstructure of the modified conjugated diene-based polymer, when the amounts of the aforementioned bonds in the modified conjugated diene-based polymer of the present embodiment fall respectively in the numeric ranges described above and the glass transition temperature of the modified conjugated diene-based polymer is −50° C. or more and less than −20° C., there is a tendency that a vulcanizate more excellent in the balance between the low hysteresis loss property and the wet skid resistance can be obtained.

The glass transition temperature is defined as a peak top (an inflection point) of a DSC differential curve obtained by recording a DSC curve during temperature increase in a prescribed range in accordance with ISO 22768:2006. Specifically, it can be measured in accordance with a method described in the examples below.

When the modified conjugated diene-based polymer of the present embodiment is a conjugated diene-aromatic vinyl copolymer, it preferably contains a few or no blocks in which 30 or more aromatic vinyl units are chained. More specifically, when the copolymer is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less with respect to the total amount of the copolymer.

(Modification Reaction Step)

In the modification reaction step, the conjugated diene-based polymer obtained by the method as described above is reacted with a modifier having a bonding group reactive to an active end of the conjugated diene-based polymer and further having a prescribed functional group having affinity or binding reactivity with a filler.

In this case, a modifier having the prescribed functional group also having an effect as a bonding group may be employed. It is preferable to carry out the modification reaction step immediately after the polymerization step. In this case, a modified conjugated diene-based polymer having a high modification ratio tends to be obtained.

When a compound having a mono-functional or di-functional bonding group is used as the modifier, a straight chain terminally modified diene-based polymer is obtained. When a compound having tri-functional or higher multi-functional bonding group is used, a branched modified diene-based polymer is obtained.

As the modifier, a mono-functional or multi-functional compound containing at least one element among nitrogen, silicon, tin, phosphorus, oxygen, sulfur and halogen is preferably used. An onium structure can be introduced into the modified conjugated diene-based polymer through a reaction by the addition of an end modifier containing an onium generating agent. Furthermore, a modifier containing a plurality of functional groups containing these elements in the molecule, or a modifier containing a functional group containing a plurality of these elements may be used.

The modifier to be used in the modification reaction step is preferably a compound having a functional group having a small amount of or no active hydrogen, such as a hydroxyl group, a carboxyl group, or a primary or secondary amino group. The active hydrogen tends to inactivate an active end of the conjugated diene-based polymer.

<Specific Description of Modifier>

Examples of the nitrogen-containing compound include, but are not limited to, an isocyanate compound, an isothiocyanate compound, an isocyanuric acid derivative, a nitrogen group-containing carbonyl compound, a nitrogen group-containing vinyl compound, and a nitrogen group-containing epoxy compound.

Examples of the silicon-containing compound include, but are not limited to, a silicon halide compound, an epoxidized silicon compound, a vinylated silicon compound, an alkoxy silicon compound, and a nitrogen group-containing alkoxy silicon compound.

Examples of the tin-containing compound include, but are not limited to, a tin halide compound and an organotin carboxylate compound.

Examples of the phosphorus-containing compound include, but are not limited to, a phosphorous acid ester compound and a phosphino compound.

Examples of the oxygen-containing compound include, but are not limited to, an epoxy compound, an ether compound, and an ester compound.

Examples of the sulfur-containing compound include, but are not limited to, a mercapto group derivative, a thiocarbonyl compound, and isothiocyanate.

Examples of the halogen-containing compound include, but are not limited to, the above-described silicon halide compound and tin halide compound.

Examples of the onium generating agent include a protected amine compound capable of forming primary or secondary amine (which generates ammonium), a protected phosphine compound capable of forming hydrophosphine (which generates phosphonium), and a compound capable of forming a hydroxyl group and thiol (which generates oxonium and sulfonium). An end modifier having the onium generating agent and each functional group for bonding to the modified conjugated diene-based polymer in the molecule is preferably used.

Examples of the functional group for bonding to the modified conjugated diene-based polymer include a carbonyl group (ketone, ester, etc.), an unsaturated group such as a vinyl group, an epoxy group, a silicon halide group, and an alkoxy silicon group.

The modifier is preferably a nitrogen-containing compound having a nitrogen-containing functional group. The nitrogen-containing compound having a nitrogen-containing functional group is preferably an amine compound not having active hydrogen, and examples include a tertiary amine compound, a protected amine compound in which the above-described active hydrogen is replaced with a protective group, and an imine compound represented by the general formula —N=C.

Examples of the isocyanate compound as the nitrogen-containing compound which is the modifier include, but are not limited to, 2,4-tolylene diisocyanate, 2,6-tolylene diisocyanate, diphenylmethane diisocyanate, polymeric type diphenylmethane diisocyanate (C-MDI), phenyl isocyanate, isophorone diisocyanate, hexamethylene diisocyanate, butyl isocyanate, and 1,3,5-benzene triisocyanate.

Examples of the isothiocyanate compound include, but are not limited to, 2,4-tolylene diisothiocyanate, 2,6-tolylene diisothiocyanate, diphenylmethane diisothiocyanate, polymeric type diphenylmethane diisothiocyanate (C-MDI), phenyl isothiocyanate, isophorone diisothiocyanate, hexamethylene diisothiocyanate, butyl isothiocyanate, and 1,3,5-benzene triisothiocyanate.

Examples of the isocyanuric acid derivative include, but are not limited to, 1,3,5-tris(3-trimethoxysilylpropyl)isocyanurate, 1,3,5-tris(3-triethoxysilylpropyl)isocyanurate, 1,3,5-tri(oxiran-2-yl)-1,3,5-triazinane-2,4,6-trione, 1,3,5-tris(isocyanatomethyl)-1,3,5-triazinane-2,4,6-trione, and 1,3,5-trivinyl-1,3,5-triazinane-2,4,6-trione.

Examples of the nitrogen group-containing carbonyl compound include, but are not limited to, 1,3-dimethyl-2-imidazolidinone, 1-methyl-3-ethyl-2-imidazolidinone, 1-methyl-3-(2-methoxyethyl)-2-imidazolidinone, N-methyl-2-pyrrolidone, N-methyl-2-piperidone, N-methyl-2-quinolone, 4,4'-bis(diethylamino)benzophenone, 4,4'-bis(dimethylamino)benzophenone, methyl-2-pyridyl ketone, methyl-4-pyridyl ketone, propyl-2-pyridyl ketone, di-4-pyridyl ketone, 2-benzoylpyridine, N,N,N',N'-tetramethylurea, N,N-dimethyl-N',N'-diphenylurea, methyl N,N-diethylcarbamate, N,N-diethylacetamide, N,N-dimethyl-N',N'- dimethylaminoacetamide, N,N-dimethyl picolinic acid amide, and N,N-dimethyl isonicotinic acid amide.

Examples of the nitrogen group-containing vinyl compound include, but are not limited to, N,N-dimethylacrylamide, N,N-dimethylmethacrylamide, N-methylmaleimide, N-methylphthalimide, N,N-bistrimethylsilylacrylamide, morpholinoacrylamide, 3-(2-dimethylaminoethyl)styrene, (dimethylamino)dimethyl-4-vinylphenylsilane, 4,4'-vinylidenebis(N,N-dimethylaniline), 4,4'-vinylidenebis(N,N-diethylaniline), 1,1-bis(4-morpholinophenyl)ethylene, and 1-phenyl-1-(4-N,N-dimethylaminophenyl)ethylene.

Examples of the nitrogen group-containing epoxy compound include, but are not limited to, a hydrocarbon compound containing an epoxy group bonded to an amino group and further include a compound having an epoxy group bonded to an ether group.

Examples of the nitrogen group-containing epoxy compound include a compound represented by the following general formula (1).

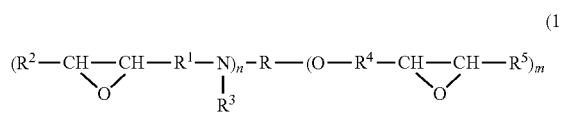

In the above-described formula (1), R is a di- or higher-valent hydrocarbon group, or a di- or higher-valent organic group having at least one polar group selected from an oxygen-containing polar group such as ether, epoxy, or ketone, a sulfur-containing polar group such as thioether or thioketone, and a nitrogen-containing polar group such as a tertiary amino group or an imino group.

The di- or higher-valent hydrocarbon group may be a saturated or unsaturated straight chain, branched, or cyclic hydrocarbon group and includes an alkylene group, an alkenylene group, a phenylene group, and the like. The number of carbon atoms is preferably 1 to 20. Specific examples include methylene, ethylene, butylene, cyclohexylene, 1,3-bis(methylene)-cyclohexane, 1,3-bis(ethylene)-cyclohexane, o-, m- or p-phenylene, m- or p-xylene, and bis(phenylene)-methane.

In the above-described formula (1), each of $R^1$ and $R^4$ is a hydrocarbon group having 1 to 10 carbon atoms, and $R^1$ and $R^4$ may be different from each other. Each of $R^2$ and $R^5$ is hydrogen or a hydrocarbon group having 1 to 10 carbon atoms, and $R^2$ and $R^5$ may be different from each other.

$R^3$ is a hydrocarbon group having 1 to 10 carbon atoms, or has a structure of formula (2) given below.

$R^1$, $R^2$, and $R^3$ may be bonded to each other to form a cyclic structure.

When $R^3$ is a hydrocarbon group, $R^3$ may be bonded to R to form a cyclic structure. In this case, $R^3$ may be a single bond.

In the above-described formula (2), $R^1$ and $R^2$ are as defined in $R^1$ and $R^2$ in the above-described formula (1), and $R^1$ and $R^2$ may be different from each other.

The nitrogen group-containing epoxy compound to be used as the modifier preferably has an epoxy group-containing hydrocarbon group, and more preferably has a glycidyl group-containing hydrocarbon group.

Examples of the hydrocarbon group containing an epoxy group bonded to an amino group or an ether group include a glycidylamino group, a diglycidylamino group and a glycidoxy group. A further preferred molecular structure is an epoxy group-containing compound having a glycidylamino group or a diglycidylamino group, and a glycidoxy group and is represented by the following general formula (3):

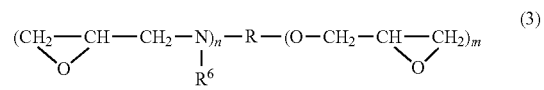

In the above-described formula (3), R is as defined in R in the above-described formula (1), and $R^6$ is a hydrocarbon group having 1 to 10 carbon atoms, or has a structure of formula (4) given below.

When $R^6$ is a hydrocarbon group, $R^6$ may be bonded to R to form a cyclic structure. In this case, $R^6$ may be a single bond.

In formula (3), n is an integer of 1 or more, and m is 0 or an integer of 1 or more.

The nitrogen group-containing epoxy-containing compound to be used as the modifier is more preferably a compound having one or more diglycidylamino group and one or more glycidoxy group in the molecule.

Examples of the nitrogen group-containing epoxy compound to be used as the modifier include, but are not limited to, N,N-diglycidyl-4-glycidoxyaniline, 1-N,N-diglycidylaminomethyl-4-glycidoxy-cyclohexane, 4-(4-glycidoxyphenyl)-(N,N-diglycidyl)aniline, 4-(4-glycidoxyphenoxy)-(N,N-diglycidyl)aniline, 4-(4-glycidoxybenzyl)-(N,N-diglycidyl)aniline, 4-(N,N'-diglycidyl-2-piperazinyl)-glycidoxybenzene, 1,3-bis(N,N-diglycidylaminomethyl)cyclohexane, N,N,N',N'-tetraglycidyl-m-xylenediamine, 4,4-methylene-bis(N,N-diglycidylaniline), 1,4-bis(N,N-diglycidylamino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline, 2-[2-(N,N-diglycidylamino)ethyl]-1-glycidylpyrrolidine, N,N-diglycidylaniline, 4,4'-diglycidyl-dibenzylmethylamine, N,N-diglycidylaniline, N,N-diglycidyl-o-toluidine, and N,N-diglycidylaminomethylcyclohexane.

Among these, N,N-diglycidyl-4-glycidoxyaniline or 1,3-bis(N,N-diglycidylaminomethyl)cyclohexane is preferably employed.

Examples of the silicon halide compound which is the modifier include, but are not limited to, dibutyldichlorosilane, methyltrichlorosilane, dimethyldichlorosilane, methyldichlorosilane, trimethylchlorosilane, tetrachlorosilane, tris(trimethylsiloxy)chlorosilane, tris(dimethylamino)chlorosilane, hexachlorodisilane, bis(trichlorosilyl)methane, 1,2-bis(trichlorosilyl)ethane, 1,2-bis(methyldichlorosilyl)ethane, 1,4-bis(trichlorosilyl)butane, and 1,4-bis(methyldichlorosilyl)butane.

Examples of the epoxidized silicon compound which is the modifier include, but are not limited to, 3-glycidoxypropyltrimethoxysilane, 3-glycidoxypropyltriethoxysilane, 3-glycidoxypropylmethyldiethoxysilane, and epoxy-modified silicone.

Examples of the alkoxy silicon compound which is the modifier include, but are not limited to, tetramethoxysilane, tetraethoxysilane, triphenoxymethylsilane, and methoxy-substituted polyorganosiloxane.

Examples of the nitrogen group-containing alkoxy silicon compound which is the modifier include, but are not limited to, 3-dimethylaminopropyltrimethoxysilane, 3-dimethylaminopropylmethyldimethoxysilane, 3-diethylaminopropyltriethoxysilane, 3-morpholinopropyltrimethoxysilane, 3-piperidinopropyltriethoxysilane, 3-hexamethyleneiminopropylmethyldiethoxysilane, 3-(4-methyl-1-piperazino)propyltriethoxysilane, 1-[3-(triethoxysilyl)-propyl]-3-methylhexahydropyrimidine, 3-(4-trimethylsilyl-1-piperazino) propyltriethoxysilane, 3-(3-triethylsilyl-1-imidazolidinyl) propylmethyldiethoxysilane, 3-(3-trimethylsilyl-1-hexahydropyrimidinyl)propyltrimethoxysilane, 3-dimethylamino-2-(dimethylaminomethyl)propyltrimethoxysilane, bis(3-dimethoxymethylsilylpropyl)-N-methylamine, bis(3-trimethoxysilylpropyl)-N-methylamine, bis(3-triethoxysilylpropyl)methylamine, tris(trimethoxysilyl)amine, tris(3-trimethoxysilylpropyl)amine, N,N,N',N'-tetra(3-trimethoxysilylpropyl)ethylenediamine, 3-isocyanatopropyltrimethoxysilane, 3-cyanopropyltrimethoxysilane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(3-dimethoxymethylsilylpropyl)-1-aza-2-silacyclopentane, 2,2-dimethoxy-1-phenyl-1-aza-2-silacyclopentane, 2,2-diethoxy-1-butyl-1-aza-2-silacyclopentane, 2,2-dimethoxy-1-methyl-1-aza-2-silacyclopentane, 2,2-dimethoxy-8-(4-methylpiperazinyl)methyl-1,6-dioxa-2-silacyclooctane, and 2,2-dimethoxy-8-(N,N-diethylamino)methyl-1,6-dioxa-2-silacyclooctane.

Examples of a compound having an unsaturated bond and protected amine in the molecule as a protected amine compound capable of forming primary or secondary amine, which is the modifier include, but are not limited to, 4,4'-vinylidenebis[N,N-bis(trimethylsilyl)aniline], 4,4'-vinylidenebis[N,N-bis(triethylsilyl)aniline], 4,4'-vinylidenebis[N,N-bis(t-butyldimethylsilyl)aniline], 4,4'-vinylidenebis[N-methyl-N-(trimethylsilyl)aniline], 4,4'-vinylidenebis[N-ethyl-N-(trimethylsilyl)aniline], 4,4'-vinylidenebis[N-methyl-N-(triethylsilyl)aniline], 4,4'-vinylidenebis[N-ethyl-N-(triethylsilyl)aniline], 4,4'-vinylidenebis[N-methyl-N-(t-butyldimethylsilyl)aniline], 4,4'-vinylidenebis[N-ethyl-N-(t-butyldimethylsilyl)aniline], 1-[4-N,N-bis(trimethylsilyl)aminophenyl]-1-[4-N-methyl-N-(trimethylsilyl)aminophenyl]ethylene, and 1-[4-N,N-bis(trimethylsilyl)aminophenyl]-1-[4-N,N-dimethylaminophenyl]ethylene.

Examples of a compound having alkoxysilane and protected amine in the molecule as a protected amine compound capable of forming primary or secondary amine, which is the modifier include, but are not limited to, N,N-bis(trimethylsilyl)aminopropyltrimethoxysilane, N,N-bis(trimethylsilyl)aminopropylmethyldimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethylmethyldiethoxysilane, N,N-bis(triethylsilyl)aminopropylmethyldiethoxysilane, 3-(4-trimethylsilyl-1-piperazino)propyltriethoxysilane, 3-(3-triethylsilyl-1-imidazolidinyl)propylmethyldiethoxysilane, 3-(3-trimethylsilyl-1-hexahydropyrimidinyl)propyltrimethoxysilane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(3-dimethoxymethylsilylpropyl)-1-aza-2-silacyclopentane, 2,2-dimethoxy-1-phenyl-1-aza-2-silacyclopentane, 2,2-diethoxy-1-butyl-1-aza-2-silacyclopentane, and 2,2-dimethoxy-1-methyl-1-aza-2-silacyclopentane.

Examples of the tin halide compound which is the modifier include, but are not limited to, tetrachloro tin, tetrabromo tin, trichlorobutyl tin, trichlorooctyl tin, dibromodimethyl tin, dichlorodibutyl tin, chlorotributyl tin, chlorotrioctyl tin, chlorotriphenyl tin, 1,2-bis(trichlorostannyl)ethane, 1,2-bis(methyldichlorostannyl)ethane, 1,4-bis(trichlorostannyl)butane, and 1,4-bis(methyldichlorostannyl)butane.

Examples of the organotin carboxylate compound which is the modifier include, but are not limited to, ethyl tin tristearate, butyl tin trioctanoate, butyl tin tristearate, butyl tin trilaurate, and dibutyl tin bisoctanoate.

Examples of the phosphorous acid ester compound which is the modifier include, but are not limited to, trimethyl phosphite, tributyl phosphite, and triphenoxide phosphite.

Examples of the phosphino compound which is the modifier include, but are not limited to: protected phosphino compounds such as P,P-bis(trimethylsilyl)phosphinopropyltrimethoxysilane and P,P-bis(triethylsilyl)phosphinopropylmethylethoxysilane; and 3-dimethylphosphinopropyltrimethoxysilane, and 3-diphenylphosphinopropyltrimethoxysilane.

Examples of the oxygen-containing compound which is the modifier include, but are not limited to: polyglycidyl ethers such as ethylene glycol diglycidyl ether and glycerin triglycidyl ether; polyepoxy compounds such as 1,4-diglycidylbenzene, 1,3,5-triglycidylbenzene, polyepoxidized liquid polybutadiene, epoxidized soybean oil, and epoxidized linseed oil; and ester compounds such as dimethyl adipate, diethyl adipate, dimethyl terephthalate, and diethyl terephthalate. These compounds generate a hydroxyl group at a polymer end.

Examples of the sulfur-containing compound which is the modifier include, but are not limited to: protected thiol compounds such as S-trimethylsilylthiopropyltrimethoxysilane and S-triethylsilylthiopropylmethyldiethylsilane; and S-methylthiopropyltrimethoxysilane, S-ethylthiopropylmethyldiethoxysilane, ethyl N,N-diethyldithiocarbamate, phenyl isothiocyanate, phenyl-1,4-diisothiocyanate, hexamethylene diisothiocyanate, and butyl isothiocyanate.

The modifier preferably has a silicon-containing functional group, and examples of the silicon-containing functional group include an alkoxysilyl group and a silanol group.

The alkoxysilyl group tends to react with, for example, the active end of the conjugated diene-based polymer to dissociate alkoxy lithium, and to form a bond between an end of the conjugated diene-based polymer chain and silicon of the modifier residue. A value obtained by subtracting the number of SiOR groups reduced through the reaction from the total number of SiOR groups contained in one molecule of the modifier corresponds to the number of alkoxysilyl groups contained in the modifier residue. An aza-sila cycle group contained in the modifier forms a bond of a >N—Li bond and a bond between the end of the conjugated diene-based polymer and silicon of the modifier residue. It is noted that the >N—Li bond tends to be easily changed to >NH and LiOH with water or the like used in finishing. In the modifier, an unreacted and remained alkoxysilyl group tends to be easily changed to silanol (a Si—OH group) with water or the like used in the finishing.

In the modification reaction step, when the active end of 3 mol of the conjugated diene-based polymer is reacted with a compound having three alkoxy group per silicon atom, namely, 1 mol of trialkoxysilane group, there is a tendency that 1 mol of the alkoxy group remains unreacted although the reaction with the conjugated diene-based polymer occurs up to 2 mol. This can be confirmed because 1 mol of the conjugated diene-based polymer remains without reacting as an unreacted polymer. Incidentally, if a large amount of alkoxy group is reacted with the active end of the conjugated diene-based polymer, a condensation reaction can be suppressed during finishing and storage, and there is a tendency that the viscosity of the polymer can be inhibited from largely changing. In particular, a modifier having one alkoxy group per silicon atom is used.

A reaction temperature employed in the modification reaction step is preferably a temperature equivalent to the polymerization temperature of the conjugated diene-based polymer, and particularly preferably a temperature without heating after polymerization. Specifically, the reaction temperature is preferably 0° C. or more and 120° C. or less, and more preferably 50° C. or more and 100° C. or less.

A reaction time employed in the modification reaction step is preferably 10 seconds or more, and more preferably 30 seconds or more.

Mixing performed in the modification reaction step may be either mechanical stirring or stirring with a static mixer or the like. When the polymerization step is performed in the continuous mode, the modification reaction step is preferably performed also in the continuous mode.

As a reactor used in the modification reaction step, for example, a tank or tubular reactor equipped with a stirrer is used. The modifier may be diluted with an inert solvent and continuously supplied to the reactor. When the polymerization step is performed in the batch mode, a method in which the polymerization reactor is charged with the modifier may be adopted, or the modification reaction step may be performed by a method in which the polymer is transferred to another reactor for performing the reaction step.

Preferred examples of the modifier to be used for producing the modified conjugated diene-based polymer of the present embodiment include a compound represented by the following general formula (VI):

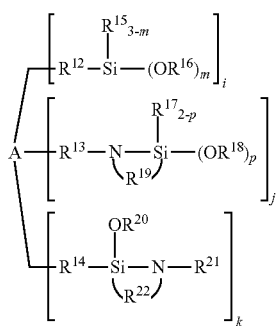

(VI)

In formula (VI), $R^{12}$ to $R^{14}$ each independently represent a single bond or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, and $R^{21}$ represents an alkyl group or a trialkylsilyl group having 1 to 20 carbon atoms.

m represents an integer of 1 to 3, and p represents 1 or 2.

Each of $R^{12}$ to $R^{22}$, m and p, if present in a plural number, is respectively independent.

i represents an integer of 0 to 6, j represents an integer of 0 to 6, k represents an integer of 0 to 6, and (i+j+k) represents an integer of 1 to 10.

A represents a single bond, a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

A hydrocarbon group represented by A includes saturated, unsaturated, aliphatic and aromatic hydrocarbon groups. The organic group not having active hydrogen is an organic group that does not inactivate an active end of the conjugated diene-based polymer. The organic group is an organic group not having a functional group having active hydrogen such as a hydroxyl group (—OH), a secondary amino group (>NH), a primary amino group (—NH$_2$) or a sulfhydryl group (—SH). When (i+j+k) is 1, A may be absent.

In the above-described formula (VI), A is preferably represented by any one of the following general formulas (II) to (V):

(II)

In the above-described formula (II), $B^1$ represents a single bond or a hydrocarbon group having 1 to 20 carbon atoms, a represents an integer of 1 to 10, and $B^1$, if present in a plural number, is respectively independent.

(III)

In the above-described formula (III), $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent.

(IV)

In the above-described formula (IV), $B^4$ represents a single bond or a hydrocarbon group having 1 to 20 carbon atoms, a represents an integer of 1 to 10, and $B^4$, if present in a plural number, is respectively independent.

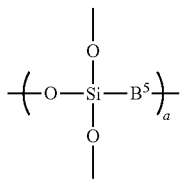

(V)

In the above-described formula (V), $B^5$ represents a single bond or a hydrocarbon group having 1 to 20 carbon atoms, a represents an integer of 1 to 10, and $B^5$, if present in a plural number, is respectively independent.

When A in the above-described formula (VI) is represented by any one of the above-described formulas (II) to (V), there is a tendency that a modified conjugated diene-based polymer yielding a rubber composition for a tire that has low adherence to a metal surface during processing and during vulcanization, and has high abrasion resistance obtained when in the form of a vulcanizate can be obtained.

Examples of the modifier of the above-described formula (VI) wherein (i+j+k) is 1 to 2 (including the above-described modifier of overlap) include, but are not limited to, 3-dimethoxymethylsilylpropyldimethylamine (mono-functional), 3-trimethoxysilylpropyldimethylamine (di-functional), bis(3-trimethoxysilylpropyl)methylamine (tetra-functional), bis(3-dimethoxymethylsilylpropyl)methylamine(di-functional), (3-trimethoxysilylpropyl)-[3-(2,2-dimethoxy-1-aza-2-silacyclopentane)propyl]ethylamine (tetra-functional), [3-(2,2-dimethoxy-1-aza-2-silacyclopentane)propyl]-(3-trimethoxysilylpropyl)methylamine (tetra-functional), bis[3-(2,2-dimethoxy-1-aza-2-silacyclopentane)propyl] methylamine (tetra-functional), bis(3-triethoxysilylpropyl) ethylamine (tetra-functional), 1-(3-triethoxysilylpropyl)-2,2-diethoxy-1-aza-2-silacyclopentane (tetra-functional), 1-(3-dimethoxymethylsilylpropyl)-2,2-dimethoxy-1-aza-2-silacyclopentane (tri-functional), [3-(2,2-diethoxy-1-aza-2-silacyclopentane)propyl]-(3-diethoxyethylsilylpropyl)methylamine (tri-functional), bis[3-(2,2-diethoxy-1-aza-2-silacyclopentane)propyl]methylamine (tetra-functional), and (3-trimethoxysilylpropyl)-[3-(1-methoxy-2-trimethylsilyl-1-sila-2-azacyclopentane)propyl]-methylamine (tri-functional).

When the modifier is a multi-functional compound, examples of the modifier of the above-described formula (VI) wherein (i+j+k) is 3 or more, and A is represented by the above-described formula (II) include, but are not limited to, tris(3-trimethoxysilylpropyl) amine, bis(3-trimethoxysilylpropyl)-[3-(2,2-dimethoxy-1-aza-2-silacyclopentane) propyl]amine, bis[3-(2,2-dimethoxy-1-aza-2-silacyclopentane)propyl]-(3-trimethoxysilylpropyl)amine, tris[3-(2,2-dimethoxy-1-aza-2-silacyclopentane)propyl]amine, tris(3-ethoxysilylpropyl)amine, bis(3-triethoxysilylpropyl)-[3-(2,2-diethoxy-1-aza-2-silacylopentane)propyl]amine, bis[3-(2,2-diethoxy-1-aza-2-silacyclopentane)propyl]-(3-triethoxysilylpropyl)amine, tris[3-(2,2-diethoxy-1-aza-2-silacyclopentane)propyl]amine, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, bis(3-trimethoxysilylpropyl)-bis[3-(2,2-dimethoxy-1-aza-2-silacyclopentane)propyl]-1,3-propanedimane, tris[3-(2,2-dimethoxy-1-aza-2-silacyclopentane)propyl]-(3-trimethoxysilylpropyl)1,3-propanediamine, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-azacyclopentane)propyl]-1,3-propanediamine, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-propanediamine, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-propanediamine, tris[3-(2,2-dimethoxy-1-aza-2-silacyclopentane)propyl]-[3-(1-methoxy-2-trimethylsilyl-1-sila-2-azacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-propanediamine, bis(3-triethoxysilylpropyl)-bis[3-(2,2-diethoxy-1-aza-2-silacyclopentane) propyl]-1,3-propanediamine, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-propanediamine, tris[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, bis(3-trimethoxysilylpropyl)-bis[3-(2,2-dimethoxy-1-aza-2-silacyclopentane)propyl]-1,3-bisaminomethylcyclohexane, tris[3-(2,2-dimethoxy-1-aza-2-silacyclopentane)propyl]-(3-trimethoxysilylpropyl)-1,3-bisaminomethylcyclohexane, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-2-azacyclopentane)propyl]-1,3-bisaminomethylcyclohexane, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-bisaminomethylcyclohexane, tris[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, tetrakis(3-triethoxysilylpropyl)-1,3-propanediamine, tris(3-triethoxysilylpropyl)-[3-(2,2-diethoxy-1-aza-2-silacyclopentane)propyl]-1,3-bisaminomethylcyclohexane, bis(3-trimethoxysilylpropyl)-bis[3-(2,2-diethoxy-1-aza-2-silacyclopentane)propyl]-1,3-bisaminomethylcyclohexane, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-bisaminomethylcyclohexane, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-bisaminomethylcyclohexane, tris[3-(2,2-diethoxy-1-aza- 2-silacyclopentane)propyl]-[3-(1-ethoxy-2-trimethylsilyl-1-sila-2-azacyclopentane)propyl]-1,3-bisaminomethylcyclohexane, tetrakis(3-trimethoxysilylpropyl)-1,6-hexamethylenediamine, and pentakis(3-trimethoxysilylpropyl)-diethylenetriamine.

Examples of the modifier to be used when A in the above-described formula (VI) is represented by the above-described formula (III) include, but are not limited to, tris(3-trimethoxysilylpropyl)-methyl-1,3-propanediamine, bis(2-trimethoxysilylpropyl)-[3-(2,2-dimethoxy-1-aza-2-silacyclopentane)propyl]-methyl-1,3-propanediamine, bis[3-(2,2-dimethoxy-1-aza-2-silacyclopentane)propyl]-(3-trimethoxysilylpropyl)-methyl-1,3-propanediamine, tris(3-triethoxysilylpropyl)-methyl-1,3-propanediamine, bis(2-triethoxysilylpropyl)-[3-(2,2-diethoxy-1-aza-2-silacyclopentane)propyl]-methyl-1,3-propanediamine, bis[3-(2,2-diethoxy-1-aza-2-silacyclopentane)propyl]-(3-triethoxysilylpropyl)-methyl-1,3-propanediamine, $N^1,N^{1'}$-(propane-1,3-diyl)bis($N^1$-methyl-$N^3,N^3$-bis(3-(trimethoxysilyl)propyl)-1,3-propanediamine) and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

Examples of the modifier to be used when A in the above-described formula (VI) is represented by the above-described formula (IV) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl]silane, bis(3-trimethoxysilylpropyl)-bis[3-(2,2-dimethoxy-1-aza-2-silacyclopentane)propyl]silane, (3-trimethoxysilyl)-[3-(1-methoxy-2-trimethylsilyl-1-sila-2-azacyclopentane)-bis[3-(2,2-dimethoxy-1-aza-2-silacyclopentane)propyl]silane, bis[3-(1-methoxy-2-trimethylsilyl-1-sila-2-azacyclopentane)-bis[3-(2,2-dimethoxy-1-aza-2-silacyclopentane)propyl]silane, tris(3-trimethoxysilylpropyl)-[3-(2,2-dimethoxy-1-aza-2-silacyclopentane)propyl]silane, bis(3-trimethoxysilylpropyl)-[3-(1-methoxy-2-trimethylsilyl-1-sila-2-azacyclopentane)propyl]-[3-(2,2-dimethoxy-1-aza-2-silacyclopentane)propyl]silane, bis[3-(1-methoxy-2-trimethylsilyl-1-sila-2-azacyclopentane)propyl]-bis(3-trimethoxysilylpropyl)silane, and bis(3-trimethoxysilylpropyl)-bis[3-(1-methoxy-2-methyl-1-sila-2-azacyclopentane)propyl]silane.

Examples of the modifier to be used when A in the above-described formula (VI) is represented by the above-described formula (V) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

Examples of the compound of the above-described formula (VI) wherein A represents an organic group having an oxygen atom and not having active hydrogen include (3-trimethoxysilylpropyl)-[3-(2,2-dimethoxy-1-aza-2-silacyclopentane)propyl] ether (tetra-functional), and 3,4,5-tris(3-trimethoxysilylpropyl)-cyclohexyl-[3-(2,2-dimethoxy-1-aza-2-silacyclopentane)propyl] ether (octa-functional).

Examples of the compound of the above-described formula (VI) wherein A represents an organic group having a phosphorus atom and not having active hydrogen include, but are not limited to, (3-trimethoxysilylpropyl)phosphate, bis(3-trimethoxysilylpropyl)-[3-(2,2-dimethoxy-1-aza-2-silacyclopentane)propyl]phosphate, bis[3-(2,2-dimethoxy-1-aza-2-silacyclopentane)propyl]-(3-trimethoxysilylpropyl)phosphate, and tris[3-(2,2-dimethoxy-1-aza-2-silacyclopentane)propyl]phosphate.

In the above-described formula (VI), preferably, A is represented by the above-described formula (II) or the above-described formula (III), and k represents 0. Thus, an easily available modifier tends to be obtained, and furthermore, the abrasion resistance and the low hysteresis loss performance obtained when the modified conjugated diene-based polymer of the present embodiment is made into a vulcanizate tend to be more excellent.

Examples of such a modifier include, but are not limited to, bis(3-trimethoxysilylpropyl)-[3-(2,2-dimethoxy-1-aza-2-silacyclopentane)propyl]amine, tris(3-trimethoxysilylpropyl)amine, tris(3-triethoxysilylpropyl)amine, tris(3-trimethoxysilylpropyl)-[3-(2,2-dimethoxy-1-aza-2-silacyclopentane)propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, tris(3-trimethoxysilylpropyl)-methyl-1,3-propanediamine, and bis[3-(2,2-dimethoxy-1-aza-2-silacyclopentane)propyl]-(3-trismethoxysilylpropyl)-methyl-1,3-propanediamine.

Preferably, in the above-described formula (VI), A is represented by the above-described formula (II) or formula (III), and k represents 0, and in the above-described formula (II) or formula (III), a represents an integer of 2 to 10. Thus, the abrasion resistance and the low hysteresis loss property obtained when the modified conjugated diene-based polymer of the present embodiment is made into a vulcanizate tend to be more excellent.

Examples of such a modifier include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

An addition amount of the compound represented by the above-described formula (VI) as the modifier can be adjusted so that the reaction can be performed with a mole number ratio between the conjugated diene-based polymer and the modifier set to a desired stoichiometric ratio, and thus, a modified conjugated diene-based polymer having a desired branching degree is obtained.

Specifically, the mole number of the conjugated diene-based polymer, with respect to the mole number of the modifier, is preferably 1.0-fold mole or more, and more preferably 2.0-fold mole or more. In this case, in the above-described formula (VI), the number of functional groups in the modifier ((m−1)×i+p×j+k) is preferably an integer of 1 to 10, and more preferably an integer of 2 to 10.

(Hydrogenation Step)

The modified conjugated diene-based polymer of the present embodiment may have a hydrogenated conjugated diene portion. A method for hydrogenating the conjugated diene portion is not especially limited, and any of known methods can be employed.

Examples of a suitable hydrogenation method include a method in which gaseous hydrogen is blown into the polymer solution in the presence of a catalyst.

Examples of the catalyst include heterogeneous catalysts such as a catalyst containing a noble metal supported on a porous inorganic substance; and homogenous catalysts such as a catalyst obtained by reacting a solubilized salt of nickel, cobalt or the like with organic aluminum or the like, and a catalyst using metallocene such as titanocene. Among these catalysts, from the viewpoint that a mild hydrogenation condition can be selected, a titanocene catalyst is preferably used. In addition, hydrogenation of an aromatic group can be performed by using a noble metal-supported catalyst.

Examples of the hydrogenation catalyst include, but are not limited to, (1) a supported heterogeneous hydrogenation catalyst obtained by supporting a metal such as Ni, Pt, Pd or Ru on carbon, silica, alumina or diatomite, (2) what is called a ziegler catalyst using an organic acid salt of Ni, Co, Fe, Cr or the like, or a transition metal salt such as acetylacetone salt, and a reducing agent such as organic aluminum, and (3) what is called an organic metal complex such as an organic metal compound of Ti, Ru, Rh or Zr. Furthermore, examples of the hydrogenation catalyst include known hydrogenation catalysts described in, for example, Japanese Examined Patent Application Publication No. S42-8704, Japanese Examined Patent Application Publication No. S43-6636, Japanese Examined Patent Application Publication No. S63-4841, Japanese Examined Patent Application Publication No. H1-37970, Japanese Examined Patent Application Publication No. H1-53851, Japanese Examined Patent Application Publication No. H2-9041 and Japanese Unexamined Patent Application Publication No. H8-109219. A preferable hydrogenation catalyst is a reaction mixture of a titanocene compound and a reducing organic metal compound.

In the process of producing the modified conjugated diene-based polymer of the present embodiment, a deactivator, a neutralizer or the like may be added if necessary to the resultant modified conjugated diene-based polymer solution after the modification reaction step.

Examples of the deactivator include, but are not limited to, water; and alcohols such as methanol, ethanol and isopropanol.

Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

To the modified conjugated diene-based polymer of the present embodiment, from the viewpoint of preventing gel formation after the polymerization and of improving stability in the processing, a stabilizer for rubber is preferably added. As the stabilizer for rubber, any of known stabilizers, not limited to the following, can be used, and preferable examples include antioxidants such as 2,6-di-tert-butyl-4-hydroxytoluene (BHT), n-octadecyl-3-(4'-hydroxy-3',5'-di-tert-butylphenol)propionate, and 2-methyl-4,6-bis[(octyl-thio)methyl]phenol.

In order to further improve the workability of the modified conjugated diene-based polymer of the present embodiment, an extender oil may be added to the modified conjugated diene-based polymer if necessary.

A preferable example of a method for adding an extender oil to the modified conjugated diene-based polymer includes, but is not limited to, a method in which an extender oil is added to the modified conjugated diene-based polymer solution to be mixed, and the resultant oil-extended copolymer solution is desolvated.

Examples of the extender oil include, but are not limited to, an aroma oil, a naphthenic oil and a paraffin oil. Among these oils, from the viewpoint of environmental safety, oil bleeding prevention and wet grip characteristics, an aroma-alternative oil containing 3% by mass or less of a polycyclic aromatic (PCA) component according to the IP 346 is preferred. Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts).

The amount of the extender oil to be added is not especially limited, and is preferably 10 parts by mass or more and 60 parts by mass or less, and more preferably 20 parts by mass or more and 37.5 parts by mass or less with respect to 100 parts by mass of the modified conjugated diene-based polymer.

As a method for recovering, from the polymer solution, the modified conjugated diene-based polymer of the present embodiment, any of known methods can be employed. Examples of the method include a method in which the polymer is filtered off after separating the solvent by steam stripping and the resultant is dehydrated and dried to recover the polymer, a method in which the solution is concentrated in a flashing tank and the resultant is devolatilized by a vent extruder or the like, and a method in which the solution is directly devolatilized using a drum dryer or the like.

(Production of Modified Conjugated Diene-Based Polymer by Blending)

In the process of producing the modified conjugated diene-based polymer of the present embodiment, a polymer that satisfies the requirements of the present invention may be prepared by properly mixing a polymer having a high modification ratio and a high molecular weight with a polymer having a low modification ratio (or unmodified) and a low molecular weight.

Examples of the polymer having a high modification ratio and a high molecular weight include a polymer having a modification ratio of 50% to 90% and a weight average molecular weight of $25 \times 10^4$ or more and $350 \times 10^4$ or less.

Examples of the unmodified polymer (or having a low modification ratio) having a low molecular weight include a polymer having a modification ratio of 0% to 60% and a weight average molecular weight of $10 \times 10^4$ or more and $150 \times 10^4$ or less.

As for the ratio between the weight average molecular weight (MwH) of the polymer having a high modification ratio and a high molecular weight and the weight average molecular weight (MwL) of the polymer having a low modification ratio and a low molecular weight, a value obtained by dividing MwL by MwH (MwL/MwH) is preferably 0.1 or more and 0.8 or less, more preferably 0.2 or more and 0.7 or less, and further preferably 0.3 or more and 0.6 or less. When the (MwL/MwH) is 0.1 or more and 0.8 or less, the adherence to a metal surface during processing and during vulcanization is low, and the abrasion resistance obtained when in the form of a vulcanizate is high.

For blending, the ratios (mass fractions) of the mass (WH) of the polymer having a high modification ratio and a high molecular weight and the mass (WL) of the polymer having a low modification ratio and a low molecular weight are indicated by the ratio of WL to the total mass (WH+WL), (WL)/(WH+WL), and are preferably 0.1 or more and 0.8 or less, more preferably 0.15 or more and 0.6 or less, and further preferably 0.2 or more and 0.5 or less. When this value is 0.1 or more and 0.8 or less, the adherence to a metal surface during processing and during vulcanization is low, and the abrasion resistance obtained when in the form of a vulcanizate is high.

A method for blending the polymers is not particularly limited, and examples include a method in which both the polymers are made into solutions, mixed and then dried, a method in which one of the polymers is made into a solution, to which the other polymer (solid) is added to prepare a solution, followed by mixing and then drying, and a method in which both the polymers are mixed in a solid state and mixed by melt-kneading using a roll or an extruder. A method in which both the polymers are made into solutions, mixed and then dried is preferred from the viewpoint of obtaining a homogeneous mixture, and a method in which both the polymers are mixed in a solid state and mixed by melt-kneading using a roll or an extruder is preferred from the viewpoint of energy efficiency.

[Polymer Composition]

A polymer composition of the present embodiment comprises 10% by mass or more of the modified conjugated diene-based polymer of the present embodiment.

The polymer composition of the present embodiment may comprise a polymer other than the modified conjugated diene-based polymer of the present embodiment. Examples of the polymer other than the modified conjugated diene-based polymer of the present embodiment include a rubber-like polymer and a resin-like polymer.

Examples of the rubber-like polymer other than the modified conjugated diene-based polymer of the present embodiment include, but are not limited to, a conjugated diene-based polymer or a hydrogenated product thereof, a random copolymer of a conjugated diene-based compound and a vinyl aromatic compound or a hydrogenated product thereof, a block copolymer of a conjugated diene-based compound and a vinyl aromatic compound or a hydrogenated product thereof, a non-diene-based polymer and a natural rubber.

Specific examples of the rubber-like polymer include, but are not limited to, a butadiene rubber or a hydrogenated product thereof, an isoprene rubber or a hydrogenated product thereof, styrene-based elastomers such as a styrene-butadiene rubber or a hydrogenated product thereof, a styrene-butadiene block copolymer or a hydrogenated product thereof, and a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an α, β-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

Examples of a mixing method for mixing the modified conjugated diene-based polymer of the present embodiment and the polymer other than the modified conjugated diene-based polymer of the present embodiment (referred to as another polymer) to obtain a polymer composition include various methods such as a method in which a solution of the modified conjugated diene-based polymer and a solution of another polymer are mixed, and a method in which the modified conjugated diene-based polymer and another polymer are mechanically mixed.

Another polymer described above may be in the form of a modified rubber imparted with a functional group having polarity such as a hydroxyl group or an amino group.

In the case of using the polymer composition of the present embodiment as a material for a tire, a butadiene rubber, an isoprene rubber, a styrene-butadiene rubber, a natural rubber or a butyl rubber are preferably used as another polymer.

When another polymer is a rubber-like polymer, the weight average molecular weight thereof is, from the viewpoint of balance between the performance and the processing characteristics, preferably 2,000 or more and 2,000,000 or less, and more preferably 5,000 or more and 1,500,000 or less. A rubber-like polymer having a low molecular weight, namely, what is called a liquid rubber, can be used. One of these rubber-like polymers may be singly used, or two or more of these may be used together.

In the case of producing a polymer composition comprising the modified conjugated diene-based polymer of the present embodiment and another rubber-like polymer (rubber composition), a content (in a mass ratio) of the modified conjugated diene-based polymer of the present embodiment to another rubber-like polymer (the modified conjugated diene-based polymer/another rubber-like polymer) is preferably 10/90 or more and 100/0 or less, more preferably 20/80 or more and 90/10 or less, and further preferably 50/50 or more and 80/20 or less.

Accordingly, the polymer composition of the present embodiment comprises, with respect to the total amount (100% by mass) of the polymer composition, the modified conjugated diene-based polymer of the present embodiment in an amount of preferably 10% by mass or more and 100% by mass or less, more preferably 20% by mass or more and 90% by mass or less, and further preferably 50% by mass or more and 80% by mass or less.

When the mass ratio of (the modified conjugated diene-based polymer/another rubber-like polymer) falls in the above-described range, the balance between the low hysteresis loss property and the wet skid resistance obtained when in the form of a vulcanizate is excellent, and the abrasion resistance and the fracture strength are also satisfactory.

The modified conjugated diene-based polymer of the present embodiment is suitably used as a vulcanizate. Examples of the vulcanizate include a tire, a hose, a shoe sole, an anti-vibration rubber, a vehicle component and a seismic isolation rubber as well as high-impact polystyrene and a resin reinforcing rubber for an ABS resin or the like.

In particular, the modified conjugated diene-based polymer is suitably used as a tread rubber composition for a tire. The vulcanizate can be obtained, for example, by kneading the modified conjugated diene-based polymer of the present embodiment and, if necessary, an inorganic filler such as a silica-based inorganic filler or carbon black, a rubber-like polymer different from the modified conjugated diene-based polymer of the present embodiment, a silane coupling agent, a rubber softener, a vulcanizing agent, a vulcanization accelerator, a vulcanization aid or the like to obtain a rubber composition, and vulcanizing the thus obtained composition by heating.

[Rubber Composition Comprising Filler]

A rubber composition of the present embodiment comprises 100 parts by mass of a rubber-like polymer comprising 10% by mass or more of the modified conjugated diene-based polymer of the present embodiment, and 5 to 150 parts by mass of a filler.

Furthermore, the filler preferably comprises a silica-based inorganic filler.

When a silica-based inorganic filler is dispersed therein, the rubber composition tends to be more excellent in the workability obtained when used for obtaining a vulcanizate and be more excellent in the balance between the low hysteresis loss property and the wet skid resistance obtained when in the form of a vulcanizate, and in the fracture strength and the abrasion resistance.

When the rubber composition of the present embodiment is to be used as a vulcanized rubber for a tire, a vehicle component such as an anti-vibration rubber or for shoes or the like, a silica-based inorganic filler is preferably comprised.

Examples of the filler include, but are not limited to, a silica-based inorganic filler, carbon black, a metal oxide and a metal hydroxide. Among these, a silica-based inorganic filler is preferred. One of these may be singly used, or two or more of these may be used together.

A content of the filler in the rubber composition of the present embodiment is 5.0 parts by mass or more and 150 parts by mass, preferably 10 parts by mass or more and 120 parts by mass or less, and more preferably 20 parts by mass or more and 100 parts by mass or less per 100 parts by mass of the rubber-like polymer comprising the modified conjugated diene-based polymer of the present embodiment.

From the viewpoint of exhibiting the effect of the filler addition, the content of the filler is 5.0 parts by mass or more, and from the viewpoint that the filler is sufficiently dispersed to attain practically sufficient workability and mechanical strength of the rubber composition, the content is 150 parts by mass or less.

The silica-based inorganic filler is not especially limited, any of known fillers can be used, a solid particle containing $SiO_2$ or $Si_3Al$ as a constituent unit is preferred, and a solid particle containing $SiO_2$ or $Si_3Al$ as a principal component of a constituent unit is more preferred. Here, the principal component refers to a component contained in the silica-based inorganic filler in an amount of 50% by mass or more, preferably 70% by mass or more, and more preferably 80% by mass or more.

Examples of the silica-based inorganic filler include, but are not limited to, silica, clay, talc, mica, diatomite, wollastonite, montmorillonite, zeolite and inorganic fibrous substances such as glass fiber.

Examples include a silica-based inorganic filler having a hydrophobized surface, and a mixture of a silica-based inorganic filler and an inorganic filler excluding silica.

Among these, from the viewpoint of the strength and the abrasion resistance, silica and glass fiber are preferred, and silica is more preferred.

Examples of the silica include dry silica, wet silica and synthetic silicate silica. Among these silica, wet silica is preferred from the viewpoint that it is excellent in the effect of improving the fracture characteristics and in the balance in the wet skid resistance.

From the viewpoint of obtaining practically good abrasion resistance and fracture characteristics in the rubber composition of the present embodiment, a nitrogen adsorption specific surface area, obtained by the BET adsorption method, of the silica-based inorganic filler is preferably 100 $m^2/g$ or more and 300 $m^2/g$ or less, and more preferably 170 $m^2/g$ or more and 250 $m^2/g$ or less. A silica-based inorganic filler having a comparatively small specific surface area (for example, a specific surface area of less than 200 $m^2/g$) and a silica-based inorganic filler having a comparatively large specific surface area (for example, a specific surface area of 200 $m^2/g$ or more) can be used in combination if necessary.

When a silica-based inorganic filler having a comparatively large specific surface area (of, for example, 200 $m^2/g$ or more) is used in particular, the good fracture characteristics and the low hysteresis loss property tend to be able to be well balanced because the dispersibility of silica can be thus so improved that an effect of improving the abrasion resistance is exhibited.

A content of the silica-based inorganic filler in the rubber composition of the present embodiment is preferably 5.0 parts by mass or more and 150 parts by mass, more preferably 10 parts by mass or more and 120 parts by mass or less, and further preferably 20 parts by mass or more and 100 parts by mass or less per 100 parts by mass of the rubber-like polymer comprising the modified conjugated diene-based polymer.

From the viewpoint of exhibiting the effect of the addition, the content of the silica-based inorganic filler is preferably 5.0 parts by mass or more, and from the viewpoint that practically sufficient workability and mechanical strength of the rubber composition are obtained by sufficient dispersion, the content is preferably 150 parts by mass or less.

Examples of the carbon black include, but are not limited to, carbon blacks of SRF, FEF, HAF, ISAF and SAF classes. Among these, a carbon black having a nitrogen adsorption specific surface area of 50 $m^2/g$ or more and dibutyl phthalate (DBP) oil absorption of 80 mL/100 g or less is preferred.

A content of the carbon black is preferably 0.5 parts by mass or more and 100 parts by mass or less, more preferably 3.0 parts by mass or more and 100 parts by mass or less, and further preferably 5.0 parts by mass or more and 50 parts by mass or less with respect to 100 parts by mass of the rubber-like polymer comprising the modified conjugated diene-based polymer.

From the viewpoint of exhibiting performances required in use as a tire or the like such as dry grip performance and conductivity, the content of the carbon black is preferably 0.5 parts by mass or more, and from the viewpoint of dispersibility, the content is preferably 100 parts by mass or less.

The metal oxide refers to a solid particle comprising a principal component of a constituent unit represented by $M_xO_y$ (wherein M represents a metal atom, and x and y each independently represent an integer of 1 to 6). Examples of the metal oxide include, but are not limited to, alumina, titanium oxide, magnesium oxide and zinc oxide.

Examples of the metal hydroxide include, but are not limited to, aluminum hydroxide, magnesium hydroxide and zirconium hydroxide.

The rubber composition of the present embodiment may comprise a silane coupling agent. The silane coupling agent is preferably a compound that has a function to make close the interaction between the rubber-like polymer and the filler, in particular has a group having affinity with or a binding property to both of the rubber-like polymer and the silica-based inorganic filler, and comprises, in one molecule, a sulfur bond portion and an alkoxysilyl group or silanol group portion.

Examples of such a compound include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

A content of the silane coupling agent is preferably 0.1 parts by mass or more and 30 parts by mass or less, more preferably 0.5 parts by mass or more and 20 parts by mass or less, and further preferably 1.0 part by mass or more and 15 parts by mass or less with respect to 100 parts by mass of the filler. When the content of the silane coupling agent falls in the aforementioned range, there is a tendency that the effect of the addition of the silane coupling agent can be more conspicuous.

The rubber composition of the present embodiment may comprise a rubber softener from the viewpoint of improvement of the workability.

As the rubber softener, a mineral oil or a liquid or low molecular weight synthetic softer is suitably used.

A mineral oil-based rubber softener, which is used for softening, expanding and improving workability of a rubber and is designated as a process oil or an extender oil, is a mixture of an aromatic ring, a naphthene ring and a paraffin chain, and one in which the number of carbon atoms of the paraffin chain is 50% by mass or more of the number of all carbon atoms is designated as a paraffin-based softener, one in which the number of carbon atoms of the naphthene ring is 30% by mass or more and 45% by mass or less of the number of all carbon atoms is designated as a naphthene-based softener, and one in which the number of aromatic carbon atoms exceeds 30% by mass of the number of all carbon atoms is designated as an aromatic-based softener.

When the modified conjugated diene-based polymer of the present embodiment is a copolymer of a conjugated diene compound and a vinyl aromatic compound, a rubber softener to be used is preferably one comprising an appropriate amount of an aromatic compound because such a softener tends to fit with the copolymer.

A content of the rubber softener is preferably 0 parts by mass or more and 100 parts by mass or less, more preferably 10 parts by mass or more and 90 parts by mass or less, and further preferably 30 parts by mass or more and 90 parts by mass or less per 100 parts by mass of the rubber-like polymer comprising the modified conjugated diene-based polymer.

When the content of the rubber softener is 100 parts by mass or less per 100 parts by mass of the rubber-like polymer, there is a tendency that the bleeding out is suppressed and the stickiness of the surface of the rubber composition of the present embodiment is suppressed.

Examples of a method for mixing the modified conjugated diene-based polymer and another rubber-like polymer, a silica-based inorganic filler, carbon black or another filler, a silane coupling agent, and an additive such as a rubber softener include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating. Among these methods, the melt-kneading method using a roll, a banbury mixer, a kneader or an extruder is preferred from the viewpoint of productivity and high kneadability.

Either of a method in which the rubber-like polymer and another filler, a silane coupling agent and an additive are kneaded all together or a method in which the components are mixed dividedly in plural times is applicable.

The rubber composition of the present embodiment may be a vulcanized composition having been vulcanized with a vulcanizing agent.

Examples of the vulcanizing agent include, but are not limited to, radical generators such as organic peroxides and azo compounds, oxime compounds, nitroso compounds, polyamine compounds, sulfur and sulfur compounds. The sulfur compounds include sulfur monochloride, sulfur dichloride, disulfide compounds and high molecular weight polysulfide compounds.

A content of the vulcanizing agent is preferably 0.01 parts by mass or more and 20 parts by mass or less, and more preferably 0.1 parts by mass or more and 15 parts by mass or less with respect to 100 parts by mass of the rubber-like polymer.

As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator may be used if necessary. As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators. Examples of a vulcanization aid include, but are not limited to, zinc oxide and stearic acid. A content of the vulcanization accelerator is preferably 0.01 parts by mass or more and 20 parts by mass or less, and more preferably 0.1 parts by mass or more and 15 parts by mass or less with respect to 100 parts by mass of the rubber-like polymer.

The rubber composition of the present embodiment may comprise, as long as the object of the present embodiment is not impaired, various additives such as other softener and filler excluding those described above, a heat resistance stabilizer, an antistatic agent, a weathering stabilizer, an anti-ageing agent, a colorant and a lubricant.

As another softener, any of known softeners can be used. Specific examples of another filler include calcium carbonate, magnesium carbonate, aluminum sulfate and barium sulfate. As each of the heat resistance stabilizer, the antistatic agent, the weathering stabilizer, the anti-ageing agent, the colorant and the lubricant, any of known materials can be used.

[Tire]

The rubber composition comprising the modified conjugated diene-based polymer of the present embodiment is suitably used as a material for a tire.

The rubber composition for a tire of the present embodiment is applicable to, but not limited to, various tires such as a fuel-efficient tire, an all-season tire, a high-performance tire and a studless tire; and various tire portions such as a tread, a carcass, a sidewall and a bead.

In particular, since the rubber composition for a tire comprising the modified conjugated diene-based polymer of the present embodiment is excellent in the balance between the low hysteresis loss property and the wet skid resistance obtained when in the form of a vulcanizate and in the abrasion resistance, it is more suitably used as a tread of a fuel-efficient tire or a high-performance tire.

EXAMPLES

The present embodiment will now be described in detail with reference to specific examples and comparative examples, and it is noted that the present embodiment is not limited to the following examples and comparative examples.

Various physical properties mentioned in the examples and comparative examples were measured by the following methods.

<Total Impurities of Starting Material>

Allenes, acetylenes and amines were quantitatively analyzed as impurities in starting materials.

The allenes and the acetylenes were determined qualitatively and quantitatively by the gas chromatography method.

As a column, Rt-Alumina BOND/MAPD (Shimadzu Corporation) was used.

The amines were extracted using boric acid and quantified by the titration method to calculate total impurities (ppm).

<Physical Property 1; Amount of Bound Styrene>

A modified conjugated diene-based polymer was used as a sample, 100 mg of the sample was dissolved in chloroform to be diluted to 100 mL, and the resultant was used as a measurement sample.

Based on the absorption of a phenyl group of styrene at the ultraviolet absorption wavelength (in the vicinity of 254 nm), the amount of bound styrene (% by mass) with respect to 100% by mass of the modified conjugated diene-based polymer used as the sample was measured (spectrophotometer "UV-2450" manufactured by Shimadzu Corporation).

<Physical Property 2; Microstructure of Butadiene Portion (Amount of 1,2-Vinyl Bond)>

A modified conjugated diene-based polymer was used as a sample, 50 mg of the sample was dissolved in 10 mL of carbon disulfide, and the resultant was used as a measurement sample.

A solution cell was used to measure an infrared spectrum in a range of 600 to 1000 cm$^{-1}$, and in accordance with a calculation formula of the Hampton method (a method described by R. R. Hampton, Analytical Chemistry 21, 923 (1949)) based on absorbance at a prescribed wavelength, a microstructure of a butadiene portion, namely, the amount of a 1,2-vinyl bond (mol %) was obtained (Fourier transform infrared spectrophotometer "FT-IR230" manufactured by JASCO Corporation).

<Physical Property 3; Molecular Weights>

[Measurement Conditions]: A modified conjugated diene-based polymer was used as a sample to measure a chromatogram using a GPC measurement apparatus (trade name "HLC-8320GPC" manufactured by Tosoh Corporation) including a series of three columns using a polystyrene-based gel as a filler and using an RI detector (trade name "HLC8020" manufactured by Tosoh Corporation), and on the basis of a calibration curve obtained using standard polystyrene, a weight average molecular weight ($Mw_1$), a number average molecular weight ($Mn_1$), a molecular weight distribution ($Mw_1/Mn_1$), a peak top molecular weight ($Mp_1$) of the modified conjugated diene-based polymer, and a ratio of a component having a molecular weight of 1,000,000 or more and 5,000,000 or less were obtained.

As an eluent, THF (tetrahydrofuran) was used.

As the columns, three columns available under the trade name "TSKgel SuperMultpore HZ-H" manufactured by Tosoh Corporation were connected to one another, and a guard column available under the trade name "TSKguardcolumn SuperMP(HZ)-H" manufactured by Tosoh Corporation was connected to a previous stage of these.

Ten (10) mg of the sample for the measurement was dissolved in 20 mL of THF to obtain a measurement solution, and 10 µL of the measurement solution was injected into the GPC measurement apparatus for performing the measurement under conditions of an oven temperature of 40° C. and a THF flow rate of 0.35 mL/min.

The peak top molecular weight ($Mp_1$) was obtained as follows.

On a GPC curve obtained by the measurement, a peak detected as a highest molecular weight component was selected. With respect to the selected peak, a molecular weight corresponding to the maximum value of the peak was calculated to be defined as a peak top molecular weight.

The ratio of the component having a molecular weight of 1,000,000 or more and 5,000,000 or less was obtained as the ratio (% by mass) of the mass of the component having a molecular weight of 1,000,000 or more and 5,000,000 or less to the total mass of the polymer.

<Physical Property 4; Mooney Viscosity of Polymer>

A modified conjugated diene-based polymer was used as a sample, and a Mooney viscosity was measured using a Mooney viscometer (trade name "VR1132" manufactured by Ueshima Seisakusho Co., Ltd.) and using an L-type rotor in accordance with JIS K6300.

A measurement temperature was set to 100° C.

First, the sample was preheated for 1 minute at a test temperature, the rotor was rotated at 2 rpm, and a torque measured 4 minutes after was defined as a Mooney viscosity ($ML_{(1+4)}$).

<Physical Property 5; Glass Transition Temperature (Tg)>

A modified conjugated diene-based polymer was used as a sample to record a DSC curve in accordance with ISO 22768:2006 using a differential scanning calorimeter "DSC3200S" manufactured by MAC Science Co., Ltd. under a flow of helium at 50 mL/min during temperature increase from −100° C. at a rate of 20° C./min, and a peak top (an inflection point) of the thus obtained DSC differential curve was defined as a glass transition temperature.

<Physical Property 6; Modification Ratio with Respect to Total Amount of Conjugated Diene-based Polymer>

A modified conjugated diene-based polymer was used as a sample for measurement, and measurement was performed by applying a characteristic that a modified basic polymer component adsorbs to a GPC column using a silica-based gel as a filler.

A chromatogram obtained by measurement using a polystyrene-based column and a chromatogram obtained by measurement using a silica-based column were obtained by using a sample solution comprising the sample for measurement and low molecular weight internal standard polystyrene, and based on a difference between these chromatograms, an adsorption amount to the silica-based column was measured to obtain a modification ratio.

Specifically, the measurement was performed as described below.

Preparation of Sample Solution for Measurement: Ten (10) mg of a sample for measurement and 5 mg of standard polystyrene were dissolved in 20 mL of THF (tetrahydrofuran) to obtain a sample solution for measurement.

GPC Measurement Conditions Using Polystyrene-Based Column:

[Measurement Conditions]: An apparatus available under the trade name of "HLC-8320GPC" manufactured by Tosoh Corporation was used, THF was used as an eluent, and 10 µL of the sample solution for measurement was injected into the apparatus to obtain a chromatogram by using an RI detector under conditions of a column oven temperature of 40° C. and a THF flow rate of 0.35 mL/min. Three columns available under the trade name "TSKgel SuperMultiporeHZ-H" manufactured by Tosoh Corporation were connected to one another, and a guard column available under the trade name "TSKguardcolumn SuperMP(HZ)-H" manufactured by Tosoh Corporation was connected to a previous stage of these.

GPC Measurement Conditions using Silica-based Column: An apparatus available under the trade name of "HLC-8320GPC" manufactured by Tosoh Corporation was used, THF was used as an eluent, and 50 µL of the sample solution was injected into the apparatus to obtain a chromatogram by using an RI detector under conditions of a column oven temperature of 40° C. and a THF flow rate of 0.5 mL/min. Columns available under the trade names "Zorbax PSM-1000S", "PSM-300S" and "PSM-60S" were connected to one another to be used, and a guard column available under the trade name "DIOL 4.6×12.5 mm 5 micron" was connected to a previous stage of these to be used.

Calculation Method for Modification Ratio: Assuming that the whole peak area was 100, the peak area of the sample was P1 and the peak area of standard polystyrene was P2 in the chromatogram obtained by using the polystyrene-based column, and that the whole peak area was 100, the peak area of the sample was P3 and the peak area of standard polystyrene was P4 in the chromatogram obtained by using the silica-based column, a modification ratio (% by mass) was obtained in accordance with the following expression:

Modification Ratio (% by mass)=[1−(P2×P3)/(P1× P4)]×100 wherein P1+P2=P3+P4=100.

<Physical Property 7; Modification Ratio of High Molecular Weight Component (Component Having Molecular Weight of 1,000,000 or More and 5,000,000 or Less)>

The modification ratio of a component having a molecular weight of 1,000,000 or more and 5,000,000 or less (high molecular weight component) was calculated by the calculation method for the modification ratio described above in (Physical Property 6) using the peak area of each peak in the range of 1,000,000 or more and 5,000,000 or less.

<Physical Property 8; Modification Ratio of Peak Top Molecular Weight Component>

On the basis of a calibration curve obtained using standard polystyrene, a weight average molecular weight ($Mw_2$), a number average molecular weight ($Mn_2$), a molecular weight distribution ($Mw_2/Mn_2$), and a peak top molecular weight ($Mp_2$) of the modified conjugated diene-based polymer were measured in accordance with the measurement described above in (Physical Property 3).

The height of the peak top molecular weight ($Mp_2$) in a chart was defined as L1.

The height of a peak top molecular weight in a chart obtained in accordance with the measurement described in (Physical Property 6) using a silica column was defined as L2.

The modification ratio of the peak top molecular weight component was calculated from L1/L2.

<Physical Property 9; Modification Degree of Peak Top Molecular Weight Component>

A modification ratio (FP) of the peak top molecular weight component obtained as described above in (Physical Property 8) was divided by a modification ratio (FT) with respect to the total amount of the conjugated diene-based polymer obtained as described above in (Physical Property 6) to calculate a modification degree.

Modification Degree of Peak Top Molecular Weight Component=(FP/FT)×100(%)

<Physical Property 10; Modification Ratio of Low Molecular Weight Component (Component Having ½ of Molecular Weight at Peak Top)>

On the basis of a calibration curve obtained using standard polystyrene, a weight average molecular weight ($Mw_2$), a number average molecular weight ($Mn_2$), a molecular weight distribution ($Mw_2/Mn_2$), and a peak top molecular weight ($Mp_2$) of the modified conjugated diene-based polymer were measured in accordance with the measurement described above in (Physical Property 3).

The height, in a chart, of a molecular weight obtained by dividing the peak top molecular weight ($Mp_2$) by 2 was defined as L3.

The height of a molecular weight obtained by dividing $Mp_2$ by 2, in a chart obtained in accordance with the measurement described in (Physical Property 6) using a silica column was defined as L4.

The modification ratio of the low molecular weight component was calculated from L3/L4.

<Physical Property 11; Modification Degree of Low Molecular Weight Component (Component Having ½ of Molecular Weight at Peak Top)>

A modification ratio (FL) of the low molecular weight component (component having ½ of a molecular weight at a peak top) obtained as described above in (Physical Property 10) was divided by a modification ratio (FT) with respect to the total amount of the conjugated diene-based polymer obtained as described above in (Physical Property 6) to calculate a modification degree.

Modification Degree of Low Molecular Weight Component=(FL/FT)×100(%)

<Physical Property 12; Shrinkage Factor (g')>

A chromatogram was measured by using a modified conjugated diene-based polymer as a sample, and using a GPC-light scattering measurement apparatus equipped with a viscosity detector including a series of three columns using a polystyrene-based gel as a filler, and on the basis of a solution viscosity and the light scattering method, a molecular weight was obtained.

As an eluent, a mixed solution of tetrahydrofuran and triethylamine (THF in TEA: prepared by mixing 5 mL of triethylamine with 1 L of tetrahydrofuran) was used.

As columns, a guard column available under the trade name of "TSKguardcolumn HHR-H" manufactured by Tosoh Corporation and columns available under the trade names "TSKgel G6000HHR", "TSKgel G5000HHR" and "TSKgel G4000HHR" manufactured by Tosoh Corporation connected to one another were used.

A GPC-light-scattering measurement apparatus (trade name "Viscotek TDAmax" manufactured by Malvern Panalytical Ltd.) equipped with a viscosity detector was used under conditions of an oven temperature of 40° C. and a THF flow rate of 1 mL/min.

Ten (10) mg of the sample for the measurement was dissolved in 20 mL of THF to obtain a measurement solution, and 200 μL of the measurement solution was injected into the GPC measurement apparatus for performing the measurement.

As for the obtained intrinsic viscosity and molecular weight of the measurement sample, when constants (K and a) in a relational expression of an intrinsic viscosity and a molecular weight ([η][η]=KMα ([η]: intrinsic viscosity, M: molecular weight) were defined as log K=−3.883 and a=0.771, 1000 to 20000000 were input as the range of the molecular weight M to prepare the relation between a standard intrinsic viscosity $[\eta]_0$ and the molecular weight M. An intrinsic viscosity [η] at each molecular weight M to this standard intrinsic viscosity no was represented by $[\eta]/[\eta]_0$ as the relation of the intrinsic viscosity [η] to the standard intrinsic viscosity $[\eta]_0$ and calculated as to the respective molecular weights M, and an average thereof was defined as the shrinkage factor (g').

<Physical Property 13; Silicon Content>

A silicon content was measured using an ICP mass spectrometry apparatus (Agilent 7700s manufactured by Agilent Technologies, Inc.).

<Physical Property 14; Nitrogen Content>

A nitrogen content was measured using a trace total nitrogen analyzer (TN-2100H manufactured by Mitsubishi Chemical Analytech Co., Ltd.).

(Example 1) Modified Conjugated Diene-Based Polymer (Sample 1)

A tank pressure vessel including a stirrer and a jacket for temperature control, which had an internal volume of 10 L, had a ratio (L/D) between the internal height (L) and the internal diameter (D) of 4.0 and had an inlet in a bottom portion and an outlet in a top portion, was used as a polymerization reactor.

1,3-Butadiene, styrene and n-hexane, from which water had been precedently eliminated, were mixed respectively at rates of 18.8 g/min, 10.3 g/min and 143.9 g/min. This mixture comprised 26 ppm of allenes, 23 ppm of acetylenes, and 6 ppm of amines. Total impurities were of 55 ppm.

In a static mixer provided in the middle of a pipe used for supplying the thus obtained mixed solution to the inlet of the reactor, n-butyllithium for performing a treatment for inactivating a remaining impurity was added at a rate of 0.109 mmol/min to be mixed, and the resultant mixed solution was continuously supplied to the bottom portion of the reactor.

In addition, a polar substance of 2,2-bis(2-oxolanyl) propane and a polymerization initiator of n-butyllithium were supplied respectively at rates of 0.0227 g/min and 0.265 mmol/min to the bottom portion of the polymerization reactor in which the mixed solution was vigorously stirred by the stirrer, so as to continuously perform a polymerization reaction.

The rotational speed of the stirrer was 200 rpm.

The temperature was controlled so that a temperature of a polymer solution in the outlet in the top portion of the reactor could be 82° C.

When the polymerization was sufficiently stabilized, a small amount of the polymerization solution prior to addition of a coupling agent was taken out through the outlet disposed in the top portion of the reactor, an antioxidant (BHT) was added thereto in a ratio of 0.2 g per 100 g of the resultant polymer, the solvent was then removed, and a Mooney viscosity (before modification) at 110° C. and various molecular weights were measured.

Next, to the polymer solution flown out through the outlet of the reactor, a modifier of bis(3-trimethoxysilylpropyl)-[3-(2,2-dimethoxy-1-aza-2-silacyclopentane)propyl]amine (abbreviated as "A" in the table) was continuously added in a rate of 0.0452 mmol/min, and the polymer solution to which the modifier had thus been added was mixed in passing through the static mixer to cause a modification reaction.

To the polymer solution in which the modification reaction had been caused, an antioxidant (BHT) was continuously added at a rate of 0.0578 g/min (a n-hexane solution) in a ratio of 0.2 g per 100 g of the resultant polymer so as to complete the coupling reaction. At the same time as the addition of the antioxidant, an oil (JOMO Process NC140 manufactured by JX Nippon Mining & Metals Corporation) was continuously added in a ratio of 37.5 g per 100 g of the resultant polymer, and the resultant was mixed by the static mixer. The solvent was removed by the steam stripping to obtain a modified conjugated diene-based polymer (sample 1).

The physical properties of the sample 1 are shown in the table below.

(Example 2) Modified Conjugated Diene-Based Polymer (Sample 2)

A modified conjugated diene-based polymer (sample 2) was obtained under the same conditions as in (Example 1) except that the modifier was changed to tris(3-trimethoxysilylpropyl)amine (abbreviated as "B" in the table). The physical properties of the sample 2 are shown in the table below.

(Example 3) Modified Conjugated Diene-Based Polymer (Sample 3)

A modified conjugated diene-based polymer (sample 3) was obtained under the same conditions as in (Example 1) except that the addition amount of the polymerization initiator n-butyllithium was changed to 0.158 mmol/min, the addition amount of the polar substance was changed to 0.0138 g/min, the modifier was changed to N-(3-trimethoxysilylpropyl)-2,2-dimethoxy-1-aza-2-silacyclopentane (abbreviated as "E" in the table), and the addition amount of the modifier was changed to 0.0389 mmol/min. The physical properties of the sample 3 are shown in the table below.

(Example 4) Modified Conjugated Diene-Based Polymer (Sample 4)

A modified conjugated diene-based polymer (sample 4) was obtained under the same conditions as in (Example 1) except that the addition amount of the polymerization initiator n-butyllithium was changed to 0.084 mmol/min, the addition amount of the polar substance was changed to 0.00798 g/min, the modifier was changed to N-3-trimethoxysilylpropyltriazole (abbreviated as "F" in the table), and the addition amount of the modifier was changed to 0.0431 mmol/min. The physical properties of the sample 4 are shown in the table below.

(Example 5) Modified Conjugated Diene-Based Polymer (Sample 5)

A modified conjugated diene-based polymer (sample 5) was obtained under the same conditions as in (Example 1) except that the addition amounts of butadiene and styrene were changed to 24.2 g/min and 5.25 g/min, respectively, and the addition amount of the polar substance was changed to 0.0163 g/min. The physical properties of the sample 5 are shown in the table below.

(Example 6) Modified Conjugated Diene-Based Polymer (Sample 6)

A modified conjugated diene-based polymer (sample 6) was obtained under the same conditions as in (Example 1) except that the addition amounts of butadiene and styrene were changed to 16.8 g/min and 12.6 g/min, respectively, and the addition amount of the polar substance was changed to 0.0252 g/min. The physical properties of the sample 6 are shown in the table below.

(Example 7) Modified Conjugated Diene-Based Polymer (Sample 7)

A modified conjugated diene-based polymer (sample 7) was obtained under the same conditions as in (Example 4)

except that a modifier of N,N-dimethyl-phenyldimethoxysilylpropylamine (abbreviated as "G" in the table) was continuously added in a rate of 0.0315 mmol/min. The physical properties of the sample 7 are shown in Table 1.

(Comparative Example 1) Modified Conjugated Diene-Based Polymer (Sample 8)

A mixture of 1,3-butadiene, styrene and n-hexane comprised 12 ppm of allenes, 11 ppm of acetylenes, and 1 ppm of amines. Total impurities were of 24 ppm. A modified conjugated diene-based polymer (sample 8) was obtained in the same manner as in (Example 1) except that this mixture was used. The physical properties of the sample 8 are shown in the table below.

(Comparative Example 2) Modified Conjugated Diene-Based Polymer (Sample 9)

A modified conjugated diene-based polymer (sample 9) was obtained under the same conditions as in (Example 1) except that the addition amount of the modifier was changed to 0.021 mmol/min. The physical properties of the sample 9 are shown in the table below.

(Comparative Example 3) Modified Conjugated Diene-based Polymer (Sample 10)

A modified conjugated diene-based polymer (sample 10) was obtained under the same conditions as in (Comparative Example 1) except that a modifier of N,N-dimethyl-phenyldimethoxysilylpropylamine (abbreviated as "G" in the table) was continuously added in a rate of 0.0315 mmol/min. The physical properties of the sample 10 are shown in the table below.

(Comparative Example 4) Modified Conjugated Diene-based Polymer (Sample 11)

A modified conjugated diene-based polymer (sample 11) was obtained under the same conditions as in (Example 3) except that the polymerization temperature was changed to 75° C. The physical properties of the sample 11 are shown in the table below.

(Comparative Example 5) Modified Conjugated Diene-based Polymer (Sample 12)

A modified conjugated diene-based polymer (sample 12) was obtained under the same conditions as in (Example 3) except that the rotational speed for the stirring was changed to 100 rpm. The physical properties of the sample 12 are shown in the table below.

(Comparative Example 6) Modified Conjugated Diene-based Polymer (Sample 13)

A modified conjugated diene-based polymer (sample 13) was obtained under the same conditions as in (Example 1) except that the modifier was changed to N,N,N'-tris(3-trimethoxysilylpropyl)-N'-[3-(2,2-dimethoxy-1-aza-2-silacyclopentane)propyl]-1,3-propanediamine (abbreviated as "C" in the table), the addition amount of the polymerization initiator n-butyllithium was changed to 0.333 mmol/min, the addition amount of the polar substance was changed to 0.0284 g/min, and the addition amount of the modifier was changed to 0.0431 mmol/min. The physical properties of the sample 13 are shown in the table below.

(Production Example 1) Non-Modified Conjugated Diene-based Polymer

A conjugated diene copolymer was obtained under the same conditions as in (Example 3) except that no modifier was used.

The weight average molecular weight was 319,000, and the number average molecular weight was 144,000.

(Example 8) Modified Conjugated Diene-based Polymer (Sample 14)

The modified conjugated diene-based polymer (sample 8) obtained in Comparative Example 1 and the polymer obtained in (Production Example 1) were mixed at a mass ratio of (sample 8):(polymer of Production Example 1)=70:30. A sealed mixer (internal volume: 0.3 L) equipped with a temperature controller was used, and the mixture was kneaded under conditions of a filling rate of 65% and a rotator rotational speed of 30 to 50 rpm to give a modified conjugated diene-based polymer (sample 14). The physical properties of the sample 14 are shown in the table below.

(Example 9) Modified Conjugated Diene-based Polymer (Sample 15)

A modified conjugated diene-based polymer (sample 15) was obtained under the same conditions as in (Example 1) except that the temperature was controlled so that a temperature of a polymer solution in the outlet in the top portion of the reactor could be 75° C. The physical properties of the sample 15 are shown in the table below.

(Example 10) Modified Conjugated Diene-based Polymer (Sample 16)

A modified conjugated diene-based polymer (sample 16) was obtained under the same conditions as in (Example 3) except that the temperature was controlled so that a temperature of a polymer solution in the outlet in the top portion of the reactor could be 87° C. The physical properties of the sample 16 are shown in the table below.

(Example 11) Modified Conjugated Diene-based Polymer (Sample 17)

A modified conjugated diene-based polymer (sample 17) was obtained under the same conditions as in (Example 3) except that the temperature was controlled so that a temperature of a polymer solution in the outlet in the top portion of the reactor could be 75° C. The physical properties of the sample 17 are shown in the table below.

TABLE 1

| | No. | | Example 1 | Example 2 | Example 3 | Example 4 |
|---|---|---|---|---|---|---|
| | Modified Conjugated Diene-based Polymer (Sample No.) | | 1 | 2 | 3 | 4 |
| Polymerization Conditions | Butadiene | g/min | 18.8 | 18.8 | 18.8 | 18.8 |
| | Styrene | g/min | 10.3 | 10.3 | 10.3 | 10.3 |
| | Normal Hexane | g/min | 143.9 | 143.9 | 143.9 | 143.9 |
| | Total impurities | ppm | 55 | 55 | 55 | 54 |
| | Polymerization Temperature | °C. | 82 | 82 | 82 | 82 |
| | n-Butyllithium for treatment | mmol/min | 0.109 | 0.109 | 0.109 | 0.109 |
| | n-Butyllithium as polymerization initiator | mmol/min | 0.265 | 0.265 | 0.158 | 0.084 |
| | Amount of Polar Substance | g/min | 0.0227 | 0.0227 | 0.0138 | 0.00798 |
| | Modifier Type | — | A | B | E | F |
| | Amount | mmol/min | 0.0452 | 0.0452 | 0.0389 | 0.0431 |
| Physical Properties | (Physical Properties 1) Amount of Bound Styrene | % by mass | 35 | 35 | 35 | 35 |
| | (Physical Properties 2) Amount of 1,2-Vinyl Bond | mol % | 41 | 41 | 41 | 41 |
| | (Physical Properties 3) Weight Average Molecular Weight | $10^4$ g/mol | 65.7 | 66.7 | 65.8 | 63.4 |
| | (Physical Properties 3) Number Average Molecular Weight | $10^4$ g/mol | 31.5 | 31.4 | 30.3 | 29.4 |
| | (Physical Properties 3) Peak Top Molecular Weight | $10^4$ g/mol | 64.2 | 63.9 | 58.4 | 59.8 |
| | (Physical Properties 3) Mw/Mn | — | 2.09 | 2.12 | 2.17 | 2.16 |
| | (Physical Properties 3) Ratio of Component Having Molecular Weight of 1 to 5 million | % by mass | 11.2 | 10.1 | 6.9 | 6.5 |
| | (Physical Properties 4) Mooney Viscosity of Polymer (100° C.) | — | 57 | 60 | 62 | 59 |
| | (Physical Properties 5) Glass Transition Temperature | °C. | −24 | −24 | −24 | −24 |
| | (Physical Properties 6) Modification Ratio with Respect to Total Amount of Conjugated Diene Polymer | % by mass | 74 | 76 | 75 | 74 |
| | (Physical Properties 7) Modification Ratio of High Molecular Weight Component | % by mass | 98 | 99 | 95 | 92 |
| | (Physical Properties 8) Modification Ratio of Peak Top Molecular Weight Component | % by mass | 98 | 96 | 84 | 83 |
| | (Physical Properties 9) Modification Degree of Peak Top Molecular Weight Component | % | 132 | 126 | 112 | 112 |
| | (Physical Properties 10) Modification Ratio of Low Molecular Weight Component | % by mass | 32 | 33 | 35 | 35 |
| | (Physical Properties 11) Modification Degree of Low Molecular Weight Component | % | 43 | 43 | 47 | 47 |
| | (Physical Properties 12) Shrinkage Factor (g') | — | 0.66 | 0.67 | 0.80 | 0.93 |
| | (Physical Properties 13) Silicon Content | mass ppm | 57 | 54 | 60 | 31 |
| | (Physical Properties 14) Nitrogen Content | mass ppm | 18 | 19 | 17 | 49 |
| | Nitrogen/Silicon Molar Ratio | — | 0.63 | 0.71 | 0.57 | 3.17 |

| | No. | | Example 5 | Example 6 | Example 7 |
|---|---|---|---|---|---|
| | Modified Conjugated Diene-based Polymer (Sample No.) | | 5 | 6 | 7 |
| Polymerization Conditions | Butadiene | g/min | 24.2 | 16.8 | 18.8 |
| | Styrene | g/min | 5.25 | 12.6 | 10.3 |
| | Normal Hexane | g/min | 143.9 | 143.9 | 143.9 |
| | Total impurities | ppm | 54 | 54 | 54 |
| | Polymerization Temperature | °C. | 82 | 82 | 82 |
| | n-Butyllithium for treatment | mmol/min | 0.109 | 0.109 | 0.109 |
| | n-Butyllithium as polymerization initiator | mmol/min | 0.265 | 0.265 | 0.084 |
| | Amount of Polar Substance | g/min | 0.0163 | 0.0252 | 0.00798 |
| | Modifier Type | — | A | A | G |
| | Amount | mmol/min | 0.0452 | 0.0347 | 0.0315 |
| Physical Properties | (Physical Properties 1) Amount of Bound Styrene | % by mass | 17 | 42 | 35 |
| | (Physical Properties 2) Amount of 1,2-Vinyl Bond | mol % | 23 | 46 | 41 |
| | (Physical Properties 3) Weight Average Molecular Weight | $10^4$ g/mol | 70.8 | 70.2 | 32.2 |
| | (Physical Properties 3) Number Average Molecular Weight | $10^4$ g/mol | 29.8 | 29.4 | 14.8 |
| | (Physical Properties 3) Peak Top Molecular Weight | $10^4$ g/mol | 66.9 | 66.3 | 29.4 |
| | (Physical Properties 3) Mw/Mn | — | 2.38 | 2.39 | 2.18 |
| | (Physical Properties 3) Ratio of Component Having Molecular Weight of 1 to 5 million | % by mass | 8.8 | 8.7 | 5.6 |
| | (Physical Properties 4) Mooney Viscosity of Polymer (100° C.) | — | 53 | 52 | 31 |
| | (Physical Properties 5) Glass Transition Temperature | °C. | −63 | −10 | −24 |
| | (Physical Properties 6) Modification Ratio with Respect to Total Amount of Conjugated Diene Polymer | % by mass | 72 | 73 | 54 |
| | (Physical Properties 7) Modification Ratio of High Molecular Weight Component | % by mass | 96 | 96 | 91 |
| | (Physical Properties 8) Modification Ratio of Peak Top Molecular Weight Component | % by mass | 92 | 92 | 65 |
| | (Physical Properties 9) Modification Degree of Peak Top Molecular Weight Component | % | 128 | 127 | 120 |
| | (Physical Properties 10) Modification Ratio of Low Molecular Weight Component | % by mass | 31 | 30 | 25 |
| | (Physical Properties 11) Modification Degree of Low Molecular Weight Component | % | 43 | 42 | 46 |
| | (Physical Properties 12) Shrinkage Factor (g') | — | 0.72 | 0.71 | 0.96 |
| | (Physical Properties 13) Silicon Content | mass ppm | 58 | 56 | 112 |

TABLE 1-continued

|  |  | 21 | 20 | 65 |
|---|---|---|---|---|
| (Physical Properties 14) Nitrogen Content | mass ppm | 21 | 20 | 65 |
| Nitrogen/Silicon Molar Ratio | — | 0.73 | 0.72 | 1.16 |

TABLE 2

| No. | | | Comparative Example 1 | Comparative Example 2 | Comparative Example 3 |
|---|---|---|---|---|---|
| Modified Conjugated Diene-based Polymer (Sample No.) | | | 8 | 9 | 10 |
| Polymerization Conditions | Butadiene | g/min | 18.8 | 18.8 | 18.8 |
| | Styrene | g/min | 10.3 | 10.3 | 10.3 |
| | Normal Hexane | g/min | 143.9 | 143.9 | 143.9 |
| | Total impurities | ppm | 24 | 54 | 54 |
| | Polymerization Temperature | ° C. | 82 | 82 | 82 |
| | n-Butyllithium for treatment | mmol/min | 0.109 | 0.109 | 0.109 |
| | n-Butyllithium as polymerization initiator | mmol/min | 0.265 | 0.265 | 0.265 |
| | Amount of Polar Substance | g/min | 0.0227 | 0.0227 | 0.0227 |
| | Modifier Type | — | A | A | G |
| | Amount | mmol/min | 0.0452 | 0.0210 | 0.0315 |
| Physical Properties | (Physical Properties 1) Amount of Bound Styrene | % by mass | 35 | 35 | 35 |
| | (Physical Properties 2) Amount of 1,2-Vinyl Bond | mol % | 41 | 41 | 41 |
| | (Physical Properties 3) Weight Average Molecular Weight | $10^4$ g/mol | 66.1 | 58.9 | 30.5 |
| | (Physical Properties 3) Number Average Molecular Weight | $10^4$ g/mol | 31.5 | 25.1 | 14.1 |
| | (Physical Properties 3) Peak Top Molecular Weight | $10^4$ g/mol | 63.2 | 62.6 | 27.9 |
| | (Physical Properties 3) Mw/Mn | — | 2.10 | 2.35 | 2.16 |
| | (Physical Properties 3) Ratio of Component Having Molecular Weight of 1 to 5 million | % by mass | 9.9 | 7.5 | 4.3 |
| | (Physical Properties 4) Mooney Viscosity of Polymer (100° C.) | — | 57 | 39 | 29 |
| | (Physical Properties 5) Glass Transition Temperature | ° C. | −24 | −24 | −24 |
| | (Physical Properties 6) Modification Ratio with Respect to Total Amount of Conjugated Diene Polymer | % by mass | 82 | 27 | 81 |
| | (Physical Properties 7) Modification Ratio of High Molecular Weight Component | % by mass | 97 | 91 | 88 |
| | (Physical Properties 8) Modification Ratio of Peak Top Molecular Weight Component | % by mass | 96 | 35 | 88 |
| | (Physical Properties 9) Modification Degree of Peak Top Molecular Weight Component | % | 117 | 130 | 109 |
| | (Physical Properties 10) Modification Ratio of Low Molecular Weight Component | % by mass | 42 | 38 | 44 |
| | (Physical Properties 11) Modification Degree of Low Molecular Weight Component | % | 51 | 141 | 54 |
| | (Physical Properties 12) Shrinkage Factor (g') | — | 0.69 | 0.71 | 0.96 |
| | (Physical Properties 13) Silicon Content | mass ppm | 56 | 13 | 108 |
| | (Physical Properties 14) Nitrogen Content | mass ppm | 19 | 5 | 61 |
| | Nitrogen/Silicon Molar Ratio | — | 0.68 | 0.77 | 1.13 |

| No. | | | Comparative Example 4 | Comparative Example 5 | Comparative Example 6 |
|---|---|---|---|---|---|
| Modified Conjugated Diene-based Polymer (Sample No.) | | | 11 | 12 | 13 |
| Polymerization Conditions | Butadiene | g/min | 18.8 | 18.8 | 18.8 |
| | Styrene | g/min | 10.3 | 10.3 | 10.3 |
| | Normal Hexane | g/min | 143.9 | 143.9 | 143.9 |
| | Total impurities | ppm | 56 | 56 | 55 |
| | Polymerization Temperature | ° C. | 75 | 82 | 82 |
| | n-Butyllithium for treatment | mmol/min | 0.109 | 0.109 | 0.109 |
| | n-Butyllithium as polymerization initiator | mmol/min | 0.158 | 0.158 | 0.333 |
| | Amount of Polar Substance | g/min | 0.0138 | 0.0138 | 0.0284 |
| | Modifier Type | — | E | E | C |
| | Amount | mmol/min | 0.0389 | 0.0389 | 0.0431 |
| Physical Properties | (Physical Properties 1) Amount of Bound Styrene | % by mass | 35 | 35 | 35 |
| | (Physical Properties 2) Amount of 1,2-Vinyl Bond | mol % | 41 | 41 | 41 |
| | (Physical Properties 3) Weight Average Molecular Weight | $10^4$ g/mol | 62.9 | 67.2 | 67.3 |
| | (Physical Properties 3) Number Average Molecular Weight | $10^4$ g/mol | 32.4 | 29.6 | 31.9 |
| | (Physical Properties 3) Peak Top Molecular Weight | $10^4$ g/mol | 57.8 | 58.0 | 64.3 |
| | (Physical Properties 3) Mw/Mn | — | 1.94 | 2.27 | 2.11 |
| | (Physical Properties 3) Ratio of Component Having Molecular Weight of 1 to 5 million | % by mass | 6.1 | 6.7 | 19.6 |
| | (Physical Properties 4) Mooney Viscosity of Polymer (100° C.) | — | 63 | 64 | 65 |
| | (Physical Properties 5) Glass Transition Temperature | ° C. | −24 | −24 | −24 |
| | (Physical Properties 6) Modification Ratio with Respect to Total Amount of Conjugated Diene Polymer | % by mass | 80 | 74 | 77 |
| | (Physical Properties 7) Modification Ratio of High Molecular Weight Component | % by mass | 96 | 87 | 100 |
| | (Physical Properties 8) Modification Ratio of Peak Top Molecular Weight Component | % by mass | 84 | 85 | 100 |

TABLE 2-continued

|  |  | % | 105 | 115 | 130 |
|---|---|---|---|---|---|
| (Physical Properties 9) Modification Degree of Peak Top Molecular Weight Component | | | | | |
| (Physical Properties 10) Modification Ratio of Low Molecular Weight Component | | % by mass | 35 | 33 | 35 |
| (Physical Properties 11) Modification Degree of Low Molecular Weight Component | | % | 44 | 45 | 45 |
| (Physical Properties 12) Shrinkage Factor (g') | | — | 0.80 | 0.82 | 0.51 |
| (Physical Properties 13) Silicon Content | | mass ppm | 61 | 61 | 73 |
| (Physical Properties 14) Nitrogen Content | | mass ppm | 16 | 17 | 35 |
| Nitrogen/Silicon Molar Ratio | | — | 0.53 | 0.56 | 0.96 |

TABLE 3

| No. | | | Example 8 | Example 9 | Example 10 | Example 11 |
|---|---|---|---|---|---|---|
| Modified Conjugated Diene-based Polymer (Sample No.) | | | 14 | 15 | 16 | 17 |
| Polymerization Conditions | Butadiene | g/min | 18.8 | 18.8 | 18.8 | 18.8 |
| | Styrene | g/min | 10.3 | 10.3 | 10.3 | 10.3 |
| | Normal Hexane | g/min | 143.9 | 143.9 | 143.9 | 143.9 |
| | Total impurities | ppm | 24 | 55 | 55 | 55 |
| | Polymerization Temperature | °C. | 82 | 75 | 87 | 75 |
| | n-Butyllithium for treatment | mmol/min | 0.109 | 0.109 | 0.109 | 0.109 |
| | n-Butyllithium as polymerization initiator | mmol/min | 0.265 | 0.265 | 0.158 | 0.158 |
| | Amount of Polar Substance | g/min | 0.0227 | 0.0227 | 0.0138 | 0.0138 |
| | Modifier   Type | — | A | A | E | E |
| | Amount | mmol/min | 0.0452 | 0.0452 | 0.0389 | 0.0389 |
| Physical Properties | (Physical Properties 1) Amount of Bound Styrene | % by mass | 35 | 35 | 35 | 35 |
| | (Physical Properties 2) Amount of 1,2-Vinyl Bond | mol % | 41 | 41 | 41 | 41 |
| | (Physical Properties 3) Weight Average Molecular Weight | $10^4$ g/mol | 65.9 | 59.3 | 67.3 | 60.1 |
| | (Physical Properties 3) Number Average Molecular Weight | $10^4$ g/mol | 25.8 | 31.5 | 30.5 | 30.3 |
| | (Physical Properties 3) Peak Top Molecular Weight | $10^4$ g/mol | 60.2 | 58.1 | 59.2 | 54.2 |
| | (Physical Properties 3) Mw/Mn | — | 2.55 | 1.88 | 2.21 | 1.98 |
| | (Physical Properties 3) Ratio of Component Having Molecular Weight of 1 to 5 million | % by mass | 13.5 | 5.2 | 8.1 | 5.1 |
| | (Physical Properties 4) Mooney Viscosity of Polymer (100° C.) | — | 47 | 52 | 65 | 57 |
| | (Physical Properties 5) Glass Transition Temperature | °C. | −24 | −24 | −24 | −24 |
| | (Physical Properties 6) Modification Ratio with Respect to Total Amount of Conjugated Diene Polymer | % by mass | 57 | 79 | 73 | 80 |
| | (Physical Properties 7) Modification Ratio of High Molecular Weight Component | % by mass | 99 | 98 | 90 | 98 |
| | (Physical Properties 8) Modification Ratio of Peak Top Molecular Weight Component | % by mass | 99 | 98 | 79 | 88 |
| | (Physical Properties 9) Modification Degree of Peak Top Molecular Weight Component | % | 174 | 124 | 108 | 110 |
| | (Physical Properties 10) Modification Ratio of Low Molecular Weight Component | % by mass | 19 | 38 | 31 | 41 |
| | (Physical Properties 11) Modification Degree of Low Molecular Weight Component | % | 33 | 48 | 42 | 51 |
| | (Physical Properties 12) Shrinkage Factor (g') | — | 0.71 | 0.64 | 0.88 | 0.80 |
| | (Physical Properties 13) Silicon Content | mass ppm | 39 | 61 | 60 | 60 |
| | (Physical Properties 14) Nitrogen Content | mass ppm | 14 | 20 | 15 | 17 |
| | Nitrogen/Silicon Molar Ratio | — | 0.72 | 0.66 | 0.50 | 0.57 |

(Examples 12 to 22) and (Comparative Examples 7 to 12)

The above-described (samples 1 to 17) were used as starting material rubbers, and rubber compositions respectively comprising the starting material rubbers were obtained in accordance with the following compositions:

Modified conjugated diene-based polymer (any of the samples 1 to 17): 100 parts by mass (oil removed)

Silica 1 (trade name "Ultrasil 7000GR" manufactured by Evonik Degussa Gmbh, nitrogen adsorption specific surface area: 170 m$^2$/g): 50.0 parts by mass Silica 2 (trade name "Zeosil Premium 200MP" manufactured by Rhodia, nitrogen adsorption specific surface area: 220 m$^2$/g): 25.0 parts by mass Carbon black (trade name "SEAST KH (N339)" manufactured by Tokai Carbon Co., Ltd.): 5.0 parts by mass Silane coupling agent (trade name "Si75" manufactured by Evonik Degussa Gmbh, bis(triethoxysilylpropyl)disulfide): 6.0 parts by mass S-RAE oil (trade name "Process NC140" manufactured by JX Nippon Mining & Metals Corporation): 37.5 parts by mass Zinc oxide: 2.5 parts by mass Stearic acid: 1.0 part by mass Antioxidant (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazyl sulfinamide): 1.7 parts by mass Vulcanization accelerator 2 (diphenylguanidine): 2.0 parts by mass Total: 239.4 parts by mass The above-described materials were kneaded as follows to obtain a rubber composition.

A sealed mixer (internal volume: 0.3 L) equipped with a temperature controller was used, and as a first stage of kneading, the starting material rubber (any of the samples 1 to 17), the fillers (the silica 1, the silica 2 and the carbon black), the silane coupling agent, the process oil, the zinc oxide and the stearic acid were kneaded under conditions of a filling rate of 65% and a rotator rotational speed of 30 to 50 rpm.

Here, the temperature of the sealed mixer was controlled to obtain the rubber composition (compound) at a discharging temperature of 155 to 160° C. This rubber composition was tested for its adherence to a roll as described later in (Evaluation 2).

Next, as a second stage of the kneading, the compound obtained as described above was cooled to room temperature, the antioxidant was added thereto, and the resultant was kneaded again to improve the dispersibility of the silica. Also in this case, the discharging temperature (for the compound) was adjusted to 155 to 160° C. by the temperature control of the mixer.

After the cooling, as a third stage of the kneading, sulfur and the vulcanization accelerators were added to and mixed with the resultant compound by an open roll set to 70° C. in accordance with JIS K6299. Thereafter, the resultant was molded and vulcanized at 160° C. for 20 minutes by a vulcanizing press. The rubber composition was evaluated for its physical properties after the vulcanization.

The physical properties of the rubber composition were measured by methods described below.

(Evaluation 1) Mooney Viscosity of Compound

The modified conjugated diene-based polymer obtained after the second stage of the kneading and before the cross-linking was used as a sample, and the Mooney viscosity was measured using a Mooney viscometer (trade name "VR1132" manufactured by Ueshima Seisakusho Co., Ltd.) and using an L-type rotor in accordance with JIS K6300.

A measurement temperature was set to 110° C.

First, the sample was preheated for 1 minute at a test temperature, the rotor was rotated at 2 rpm, and a torque measured 4 minutes after was defined as a Mooney viscosity ($ML_{(1+4)}$).

The obtained value of the Mooney viscosity was shown as an index obtained assuming that the value of the rubber composition of Comparative Example 7 was 100. This value smaller than 100 indicates a larger Mooney viscosity and lower fluidity of an unvulcanized compound.

(Evaluation 2) Adherence to Roll

The rubber composition obtained by the first stage of the kneading was kneaded five times by an open roll in accordance with JIS K6299. In this operation, the extent to which the rubber composition was rolled up on the roll was shown as an index obtained assuming that the result of the rubber composition of Comparative Example 7 was 100. An index larger than 100 indicated that the rubber composition was difficult to roll up on a roll, namely, had low adherence to a metal surface during processing and during vulcanization.

(Evaluation 3) Viscoelasticity Parameter

A viscoelasticity testing machine "ARES" manufactured by Rheometric Scientific, Inc. was used to measure a viscoelasticity parameter in a torsion mode as to the rubber composition after the vulcanization. Each measurement value was shown as an index obtained assuming that the result of the rubber composition of Comparative Example 7 was 100.

A tan δ measured at 0° C. at a frequency of 10 Hz and strain of 1% was used as an index of the wet grip characteristics. A larger value indicates better wet grip characteristics.

A tan δ measured at 50° C. at a frequency of 10 Hz and strain of 3% was used as an index of fuel efficiency. A smaller value indicates higher fuel efficiency.

(Evaluation 4) Tensile Breaking Strength and Tensile Breaking Elongation

The tensile breaking strength and the tensile breaking elongation were measured as to the rubber composition after the vulcanization in accordance with a tensile test of JIS K6251, and results are shown as indexes obtained assuming that the result of Comparative Example 7 was 100.

A larger value indicated larger tensile breaking strength and larger tensile breaking elongation.

(Evaluation 5) Abrasion Resistance

An Acron abrasion tester (manufactured by Yasuda Seiki Seisakusho, Ltd.) was used to measure an abrasion amount through 1000 rotations at a load of 44.4 N as to the rubber composition after the vulcanization in accordance with JIS K6264-2, and results are shown as indexes obtained assuming that the result of Comparative Example 7 was 100. A larger index indicated better abrasion resistance.

TABLE 4

|  |  | Example 12 | Example 13 | Example 14 | Example 15 | Example 16 | Example 17 | Example 18 |
|---|---|---|---|---|---|---|---|---|
| Modified Conjugated Diene-based Polymer (Sample No.) |  | 1 | 2 | 3 | 4 | 5 | 6 | 7 |
| Mooney Viscosity of Compound | index | 99 | 100 | 85 | 79 | 102 | 104 | 105 |
| Adherence to Roll | index | 130 | 130 | 110 | 110 | 120 | 110 | 120 |
| 50° C. tanδ (strain 3%) | index | 110 | 113 | 108 | 103 | 128 | 82 | 99 |
| 0° C. tanδ (strain 1%) | index | 102 | 100 | 104 | 99 | 91 | 123 | 96 |
| Tensile Breaking Strength | index | 104 | 104 | 111 | 114 | 107 | 110 | 96 |
| Tensile Breaking Elongation | index | 98 | 99 | 108 | 109 | 104 | 102 | 90 |
| Abrasion Resistance | index | 107 | 108 | 111 | 114 | 113 | 105 | 100 |

TABLE 5

| | | Comparative Example 7 | Comparative Example 8 | Comparative Example 9 | Comparative Example 10 | Comparative Example 11 | Comparative Example 12 |
|---|---|---|---|---|---|---|---|
| Modified Conjugated Diene-based Polymer (Sample No.) | | 8 | 9 | 10 | 11 | 12 | 13 |
| Mooney Viscosity of Compound | index | 100 | 110 | 109 | 87 | 86 | 105 |
| Adherence to Roll | index | 100 | 120 | 95 | 109 | 108 | 120 |
| 50° C. tanδ (strain 3%) | index | 100 | 79 | 96 | 107 | 108 | 117 |
| 0° C. tanδ (strain 1%) | index | 100 | 87 | 93 | 104 | 103 | 100 |
| Tensile Breaking Strength | index | 100 | 88 | 89 | 111 | 96 | 91 |
| Tensile Breaking Elongation | index | 100 | 90 | 92 | 108 | 91 | 85 |
| Abrasion Resistance | index | 100 | 93 | 99 | 94 | 91 | 93 |

TABLE 6

| | | Example 19 | Example 20 | Example 21 | Example 22 |
|---|---|---|---|---|---|
| Modified Conjugated Diene-based Polymer (Sample No.) | | 14 | 15 | 16 | 17 |
| Mooney Viscosity of Compound | index | 90 | 96 | 88 | 83 |
| Adherence to Roll | index | 130 | 127 | 110 | 108 |
| 50° C. tanδ (strain 3%) | index | 110 | 109 | 105 | 109 |
| 0° C. tanδ (strain 1%) | index | 100 | 107 | 103 | 103 |
| Tensile Breaking Strength | index | 107 | 108 | 108 | 114 |
| Tensile Breaking Elongation | index | 97 | 100 | 110 | 110 |
| Abrasion Resistance | index | 105 | 102 | 108 | 107 |

As shown in the above tables, it was confirmed that the rubber compositions of Examples 12 to 22 had lower adherence to a roll than that of the rubber compositions of Comparative Examples 7 to 12. It was confirmed that these rubber compositions of Examples 12 to 22 were excellent in the balance between the wet grip characteristics and the fuel efficiency obtained when in the form of a vulcanizate and also in the abrasion resistance. It was also confirmed that these rubber compositions of Examples 12 to 22 had practically sufficient fracture strength obtained when in the form of a vulcanizate.

This application is based upon the prior Japanese patent application (Japanese Patent Application No. 2007-090342), filed to the Japanese Patent Office on Apr. 28, 2017, the entire contents of which are incorporated herein by reference.

INDUSTRIAL APPLICABILITY

A modified conjugated diene-based polymer according to the present invention is industrially applicable in the fields of tire treads, vehicle interiors and exteriors, anti-vibration rubbers, belts, shoes, foams and various industrial products.

The invention claimed is:

1. A modified conjugated diene-based polymer, wherein the modified conjugated diene-based polymer
    has a weight average molecular weight of $20 \times 10^4$ or more and $300 \times 10^4$ or less,
    has a molecular weight distribution Mw/Mn of 1.6 or more and 4.0 or less,
    has a modification ratio of 30% by mass or more and 80% by mass or less with respect to a total amount of the conjugated diene-based polymer, and
    comprises 5% by mass or more and 50% by mass or less of a component having a molecular weight of 1,000,000 or more and 5,000,000 or less in GPC (gel permeation chromatography), wherein
    a modification ratio of the component having a molecular weight of 1,000,000 or more and 5,000,000 or less is 90% by mass or more and 100% by mass or less.

2. The modified conjugated diene-based polymer according to claim 1, wherein
    a modification ratio of a molecular weight component with a peak top, or a peak top of the largest molecular weight among molecular weights of a plurality of peaks, if present, in GPC is 1.10 times or more a modification ratio of the whole modified conjugated diene-based polymer.

3. The modified conjugated diene-based polymer according to claim 1, wherein
    a modification ratio of a molecular weight component having ½ of a molecular weight at a peak top, or a peak top of the largest molecular weight among molecular weights of a plurality of peaks, if present, in GPC is ½ or less of a modification ratio of the whole modified conjugated diene-based polymer.

4. The modified conjugated diene-based polymer according to claim 1, wherein
    Mw/Mn in GPC is 2.0 or more and 4.0 or less, and
    shrinkage factor g' is 0.64 or more and 1.00 or less.

5. The modified conjugated diene-based polymer according to claim 1, wherein
    the modified conjugated diene-based polymer comprises 3 mass ppm or more each of nitrogen and silicon, wherein
    a molar ratio of nitrogen to silicon (nitrogen/silicon) is 1.1 or more and less than 10.

6. The modified conjugated diene-based polymer according to claim 1, wherein
    the modified conjugated diene-based polymer comprises 3 mass ppm or more each of nitrogen and silicon, wherein
    a molar ratio of nitrogen to silicon (nitrogen/silicon) is 0.1 or more and less than 0.9.

7. A polymer composition comprising 10% by mass or more of the modified conjugated diene-based polymer according to claim 1.

8. A rubber composition comprising
    100 parts by mass of a rubber-like polymer comprising 10% by mass or more of the modified conjugated diene-based polymer according to claims 1, and
    5 to 150 parts by mass of a filler.

* * * * *